United States Patent
Cho et al.

(10) Patent No.: US 10,849,173 B2
(45) Date of Patent: Nov. 24, 2020

(54) METHOD FOR TRANSMITTING/RECEIVING DATA IN WIRELESS COMMUNICATION SYSTEM AND APPARATUS SUPPORTING SAME

(71) Applicant: LG ELECTRONICS INC., Seoul (KR)

(72) Inventors: Heejeong Cho, Seoul (KR); Jiwon Kang, Seoul (KR); Jaehoon Chung, Seoul (KR); Heejin Kim, Seoul (KR); Ilmu Byun, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 16/310,767

(22) PCT Filed: Jun. 16, 2017

(86) PCT No.: PCT/KR2017/006304
§ 371 (c)(1),
(2) Date: Dec. 17, 2018

(87) PCT Pub. No.: WO2017/217802
PCT Pub. Date: Dec. 21, 2017

(65) Prior Publication Data
US 2019/0182874 A1 Jun. 13, 2019

Related U.S. Application Data

(60) Provisional application No. 62/351,278, filed on Jun. 16, 2016.

(51) Int. Cl.
*H04W 76/10* (2018.01)
*H04W 28/02* (2009.01)
(Continued)

(52) U.S. Cl.
CPC ............ *H04W 76/10* (2018.02); *H04W 8/26* (2013.01); *H04W 28/0268* (2013.01);
(Continued)

(58) Field of Classification Search
CPC . H04L 61/20; H04L 61/2007; H04L 61/6018; H04W 28/0268; H04W 72/04;
(Continued)

(56) References Cited

U.S. PATENT DOCUMENTS

2008/0132269 A1 6/2008 Shen et al.
2012/0302196 A1 11/2012 Chin et al.
(Continued)

FOREIGN PATENT DOCUMENTS

WO WO 2012/011776 A2 1/2012
WO WO 2015/137632 A1 9/2015

*Primary Examiner* — Kan Yuen
(74) *Attorney, Agent, or Firm* — Birch, Stewart, Kolasch & Birch, LLP

(57) ABSTRACT

The present invention relates to a method and an apparatus for transmitting and receiving data by a base station in a wireless communication system. The present invention may provide a method and an apparatus which performs establishing a first session for transmitting and receiving data to and from a first network node; receiving uplink data for providing a specific service from a UE in a connected or unconnected state; allocating a first UE identifier to identify the UE by a second network node; and transmitting the uplink data to the second network node together with the first UE identifier and a base station identifier for identifying the base station.

20 Claims, 21 Drawing Sheets

(51) Int. Cl.
    *H04W 76/20*     (2018.01)
    *H04W 8/26*     (2009.01)
    *H04W 72/04*     (2009.01)
    *H04L 29/12*     (2006.01)
    *H04W 88/02*     (2009.01)
    *H04W 88/08*     (2009.01)

(52) U.S. Cl.
    CPC ........... *H04W 72/04* (2013.01); *H04W 76/20* (2018.02); *H04L 61/2007* (2013.01); *H04L 61/6018* (2013.01); *H04W 88/02* (2013.01); *H04W 88/08* (2013.01)

(58) Field of Classification Search
    CPC . H04W 72/0433; H04W 76/10; H04W 76/11; H04W 76/20; H04W 76/22; H04W 88/02; H04W 88/08; H04W 8/26
    See application file for complete search history.

(56) References Cited

U.S. PATENT DOCUMENTS

| | | |
|---|---|---|
| 2013/0034071 A1 | 2/2013 | Lee et al. |
| 2014/0254523 A1* | 9/2014 | Chai ................ H04W 72/04 370/329 |
| 2018/0220478 A1* | 8/2018 | Zhu ................ H04L 45/306 |

* cited by examiner

[FIG. 1]
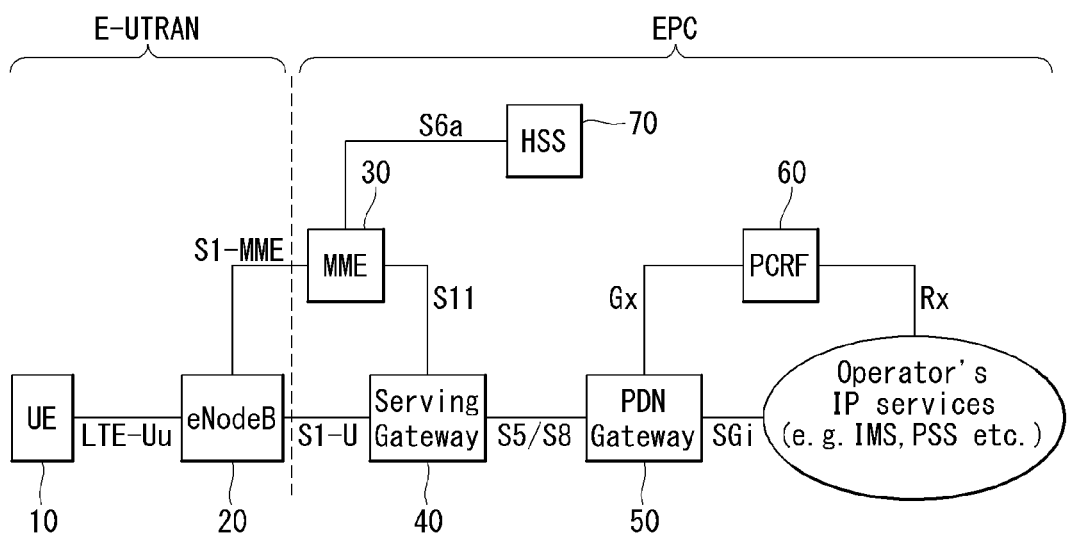

[FIG. 2]
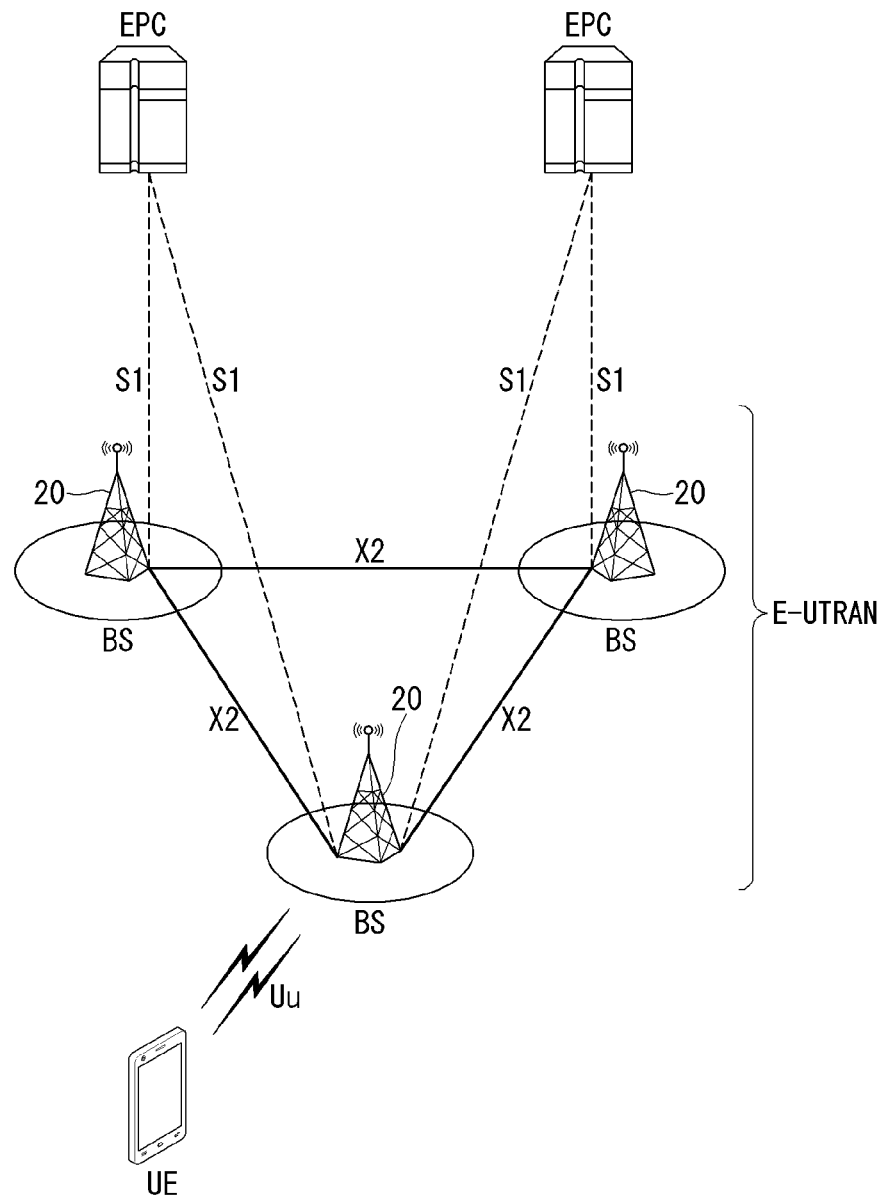

【FIG. 3】
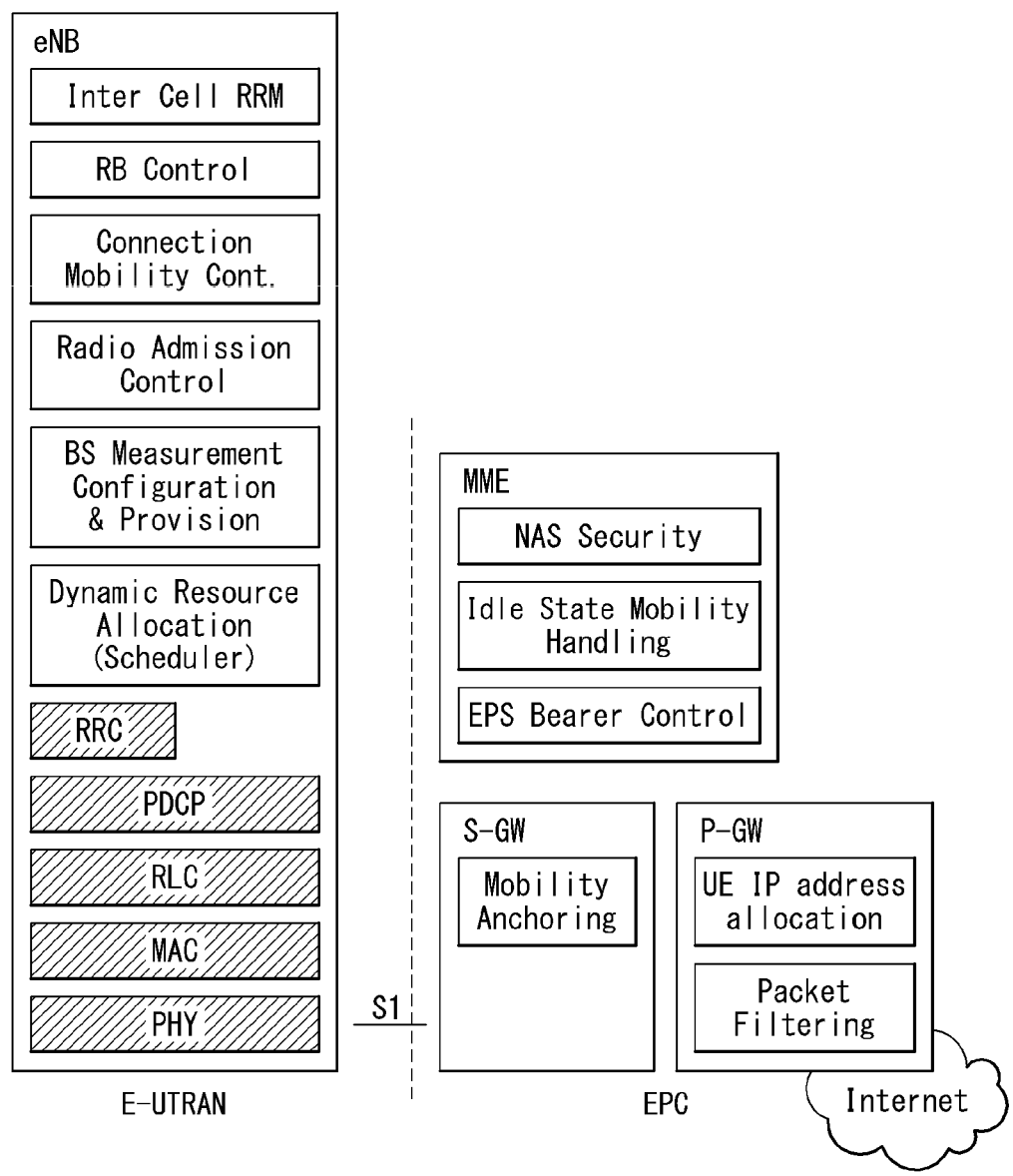

[FIG. 4]
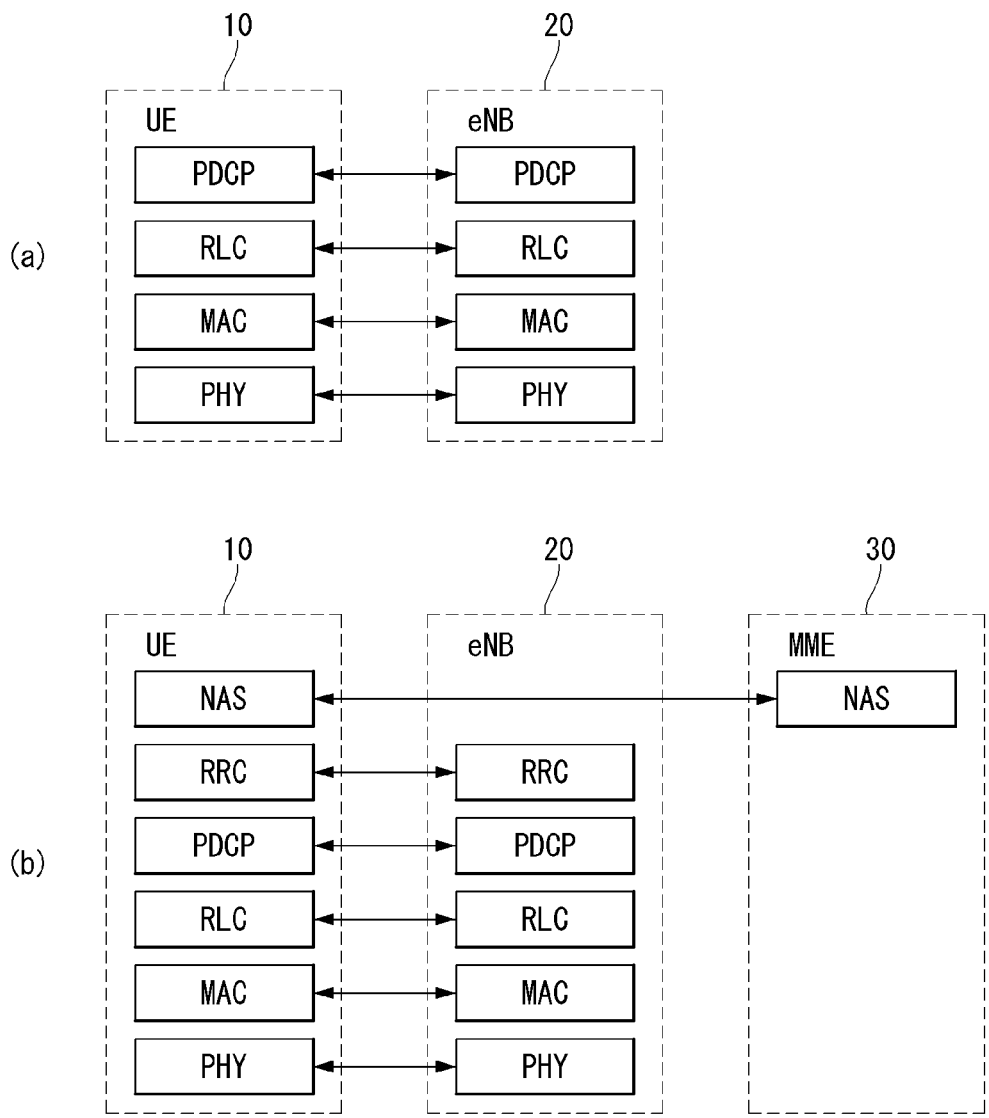

[FIG. 5]
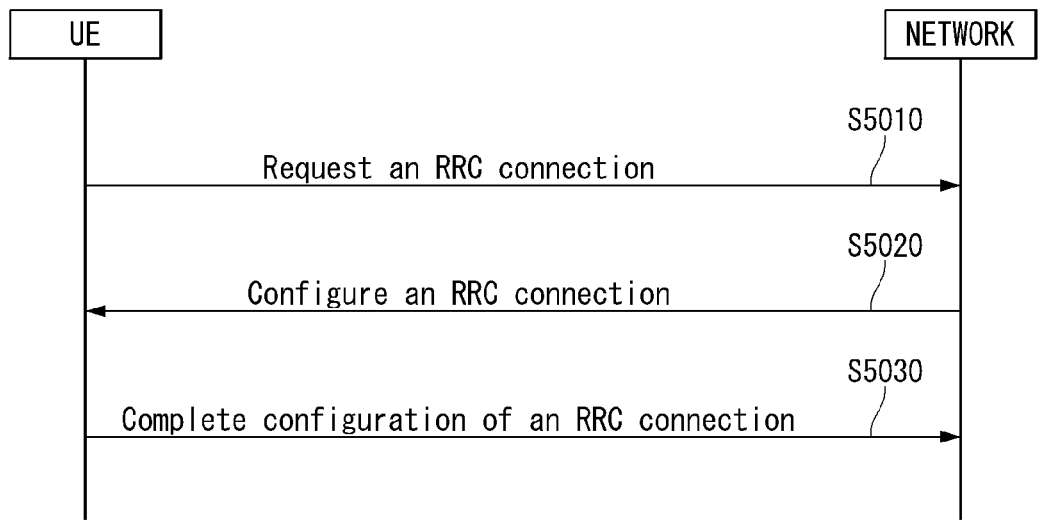
[FIG. 6]
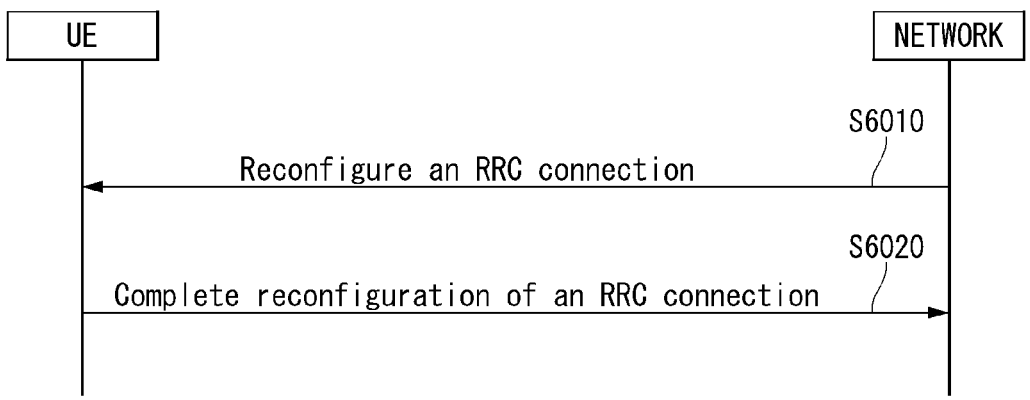

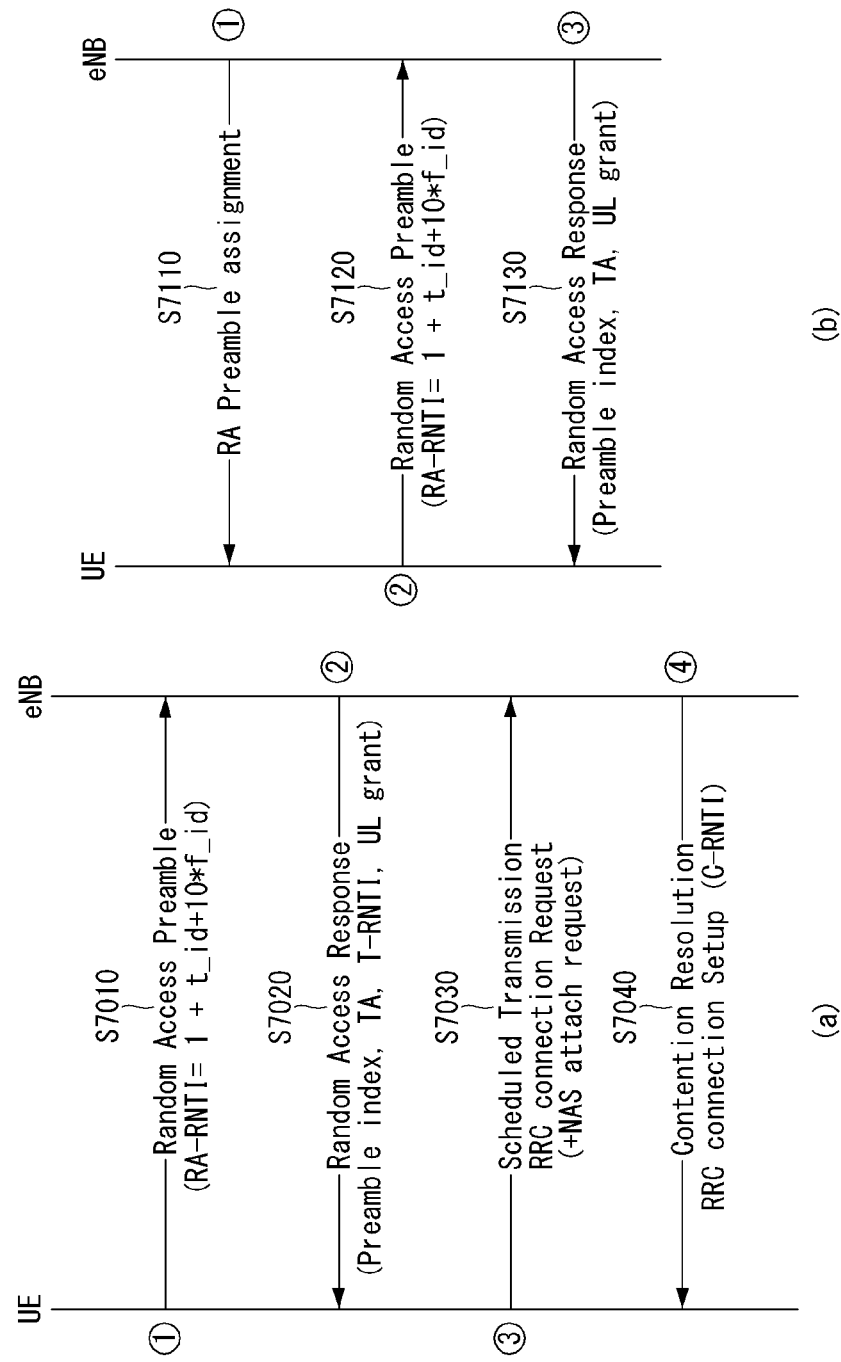
[FIG. 7]

[FIG. 8]
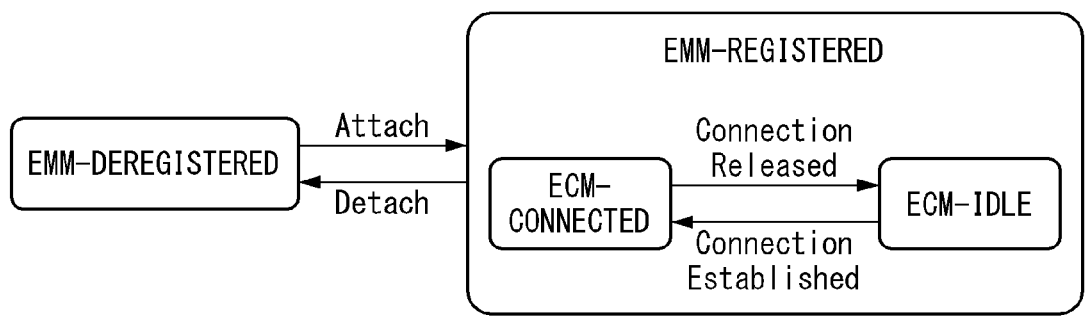
[FIG. 9]
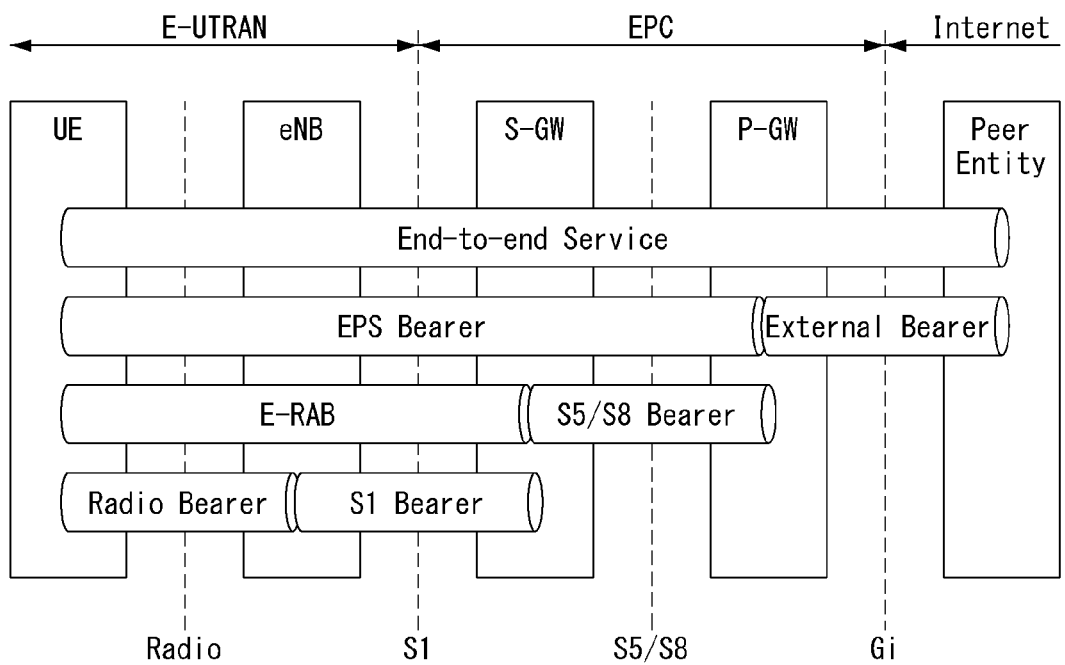

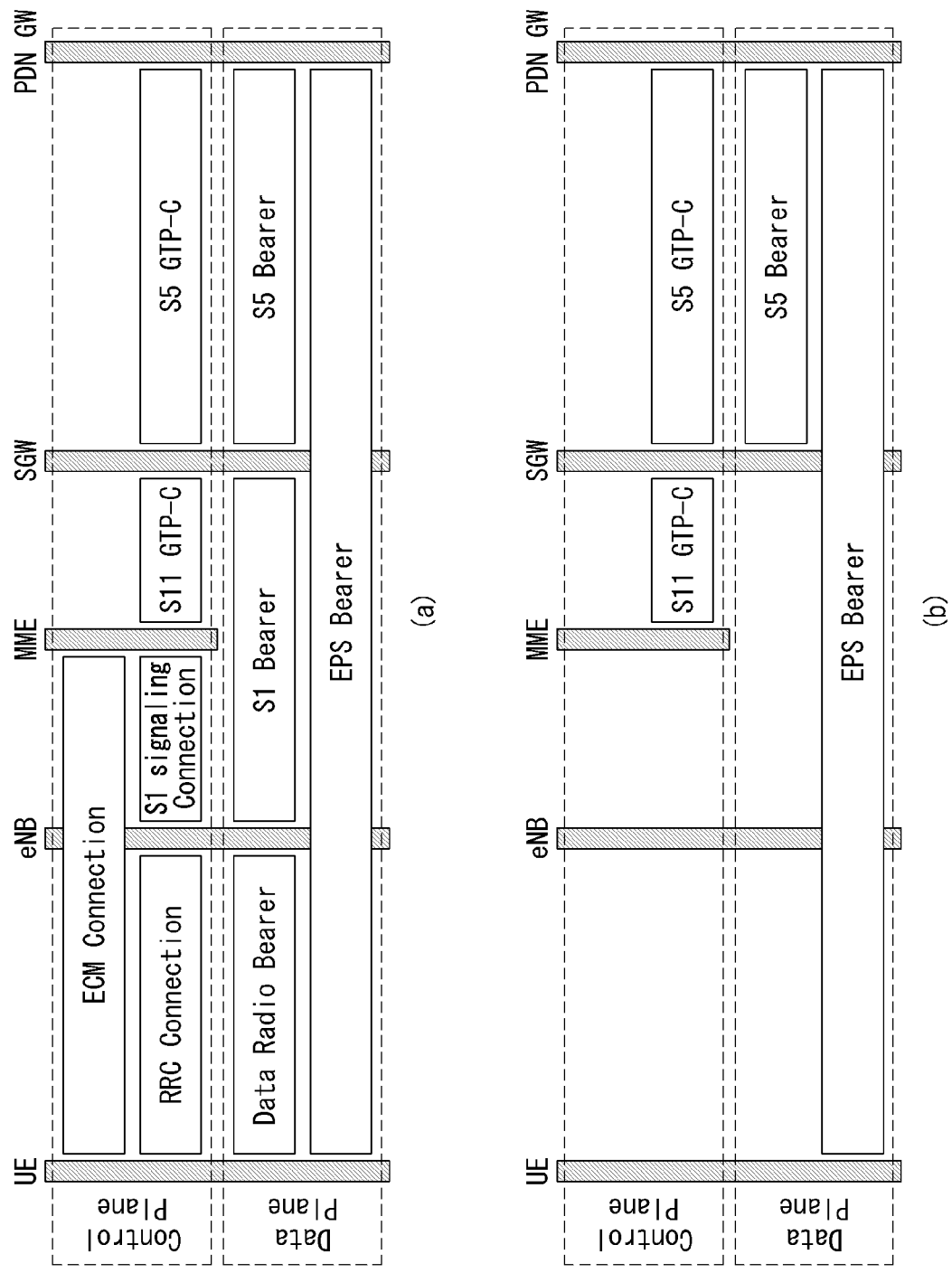

[FIG. 11]
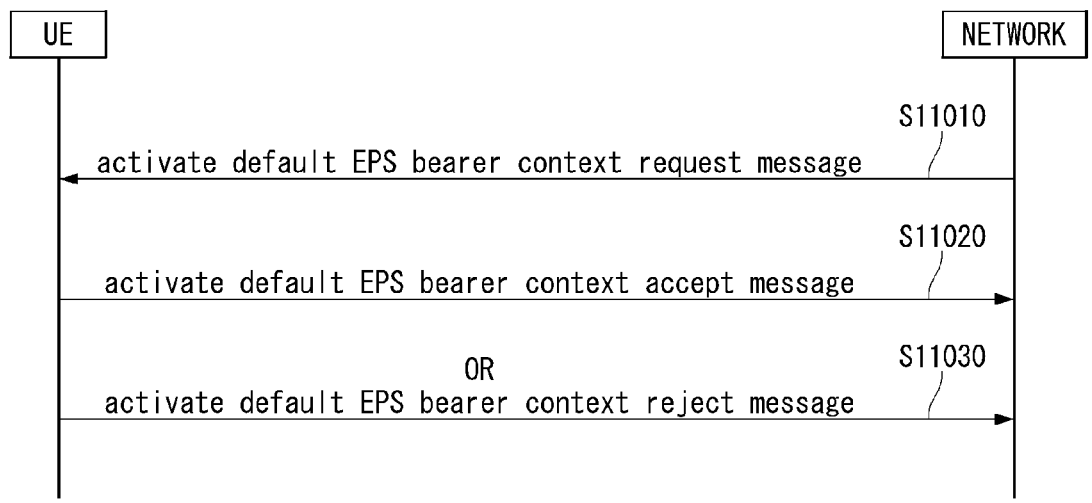

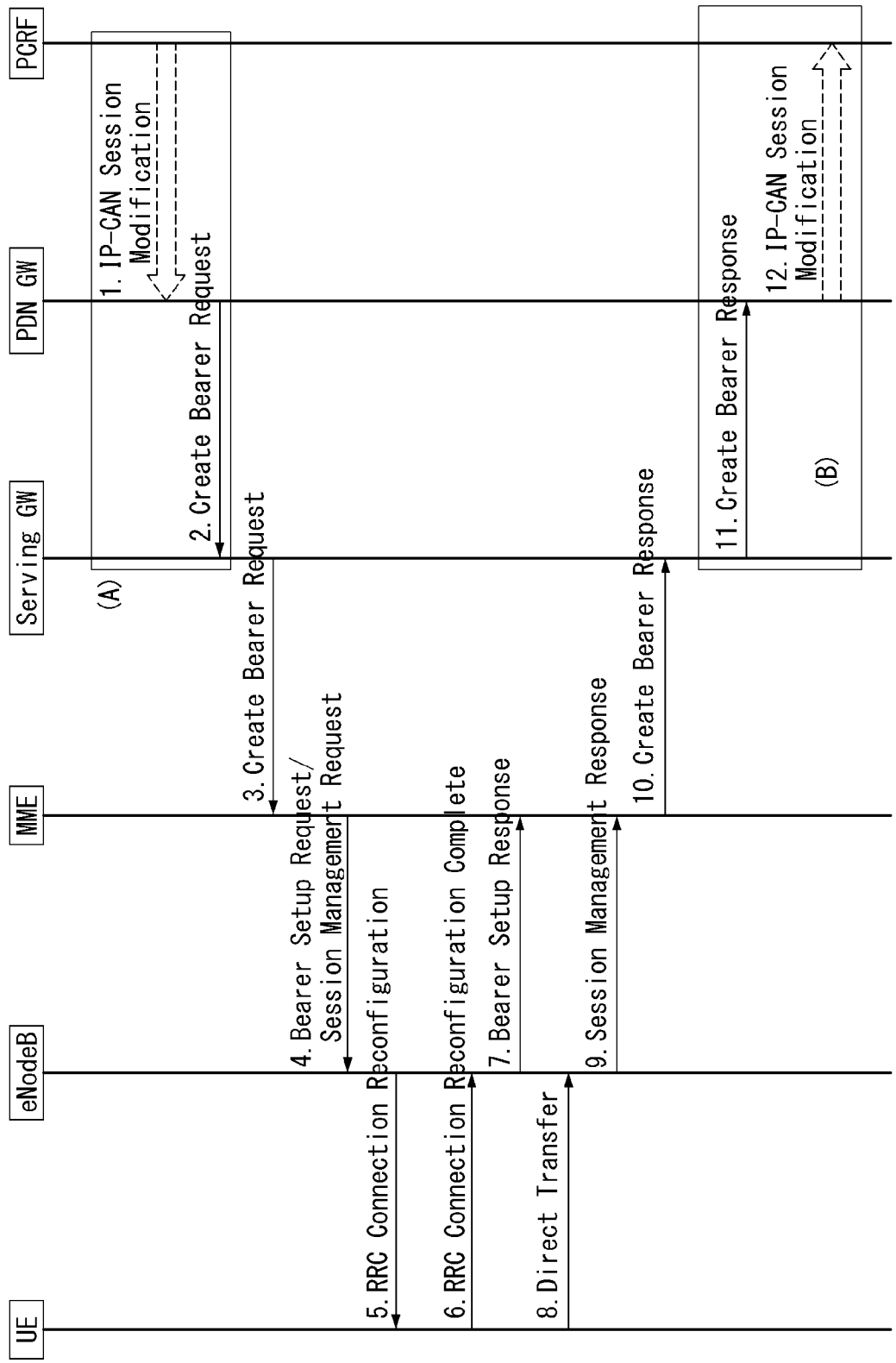
[FIG. 12]

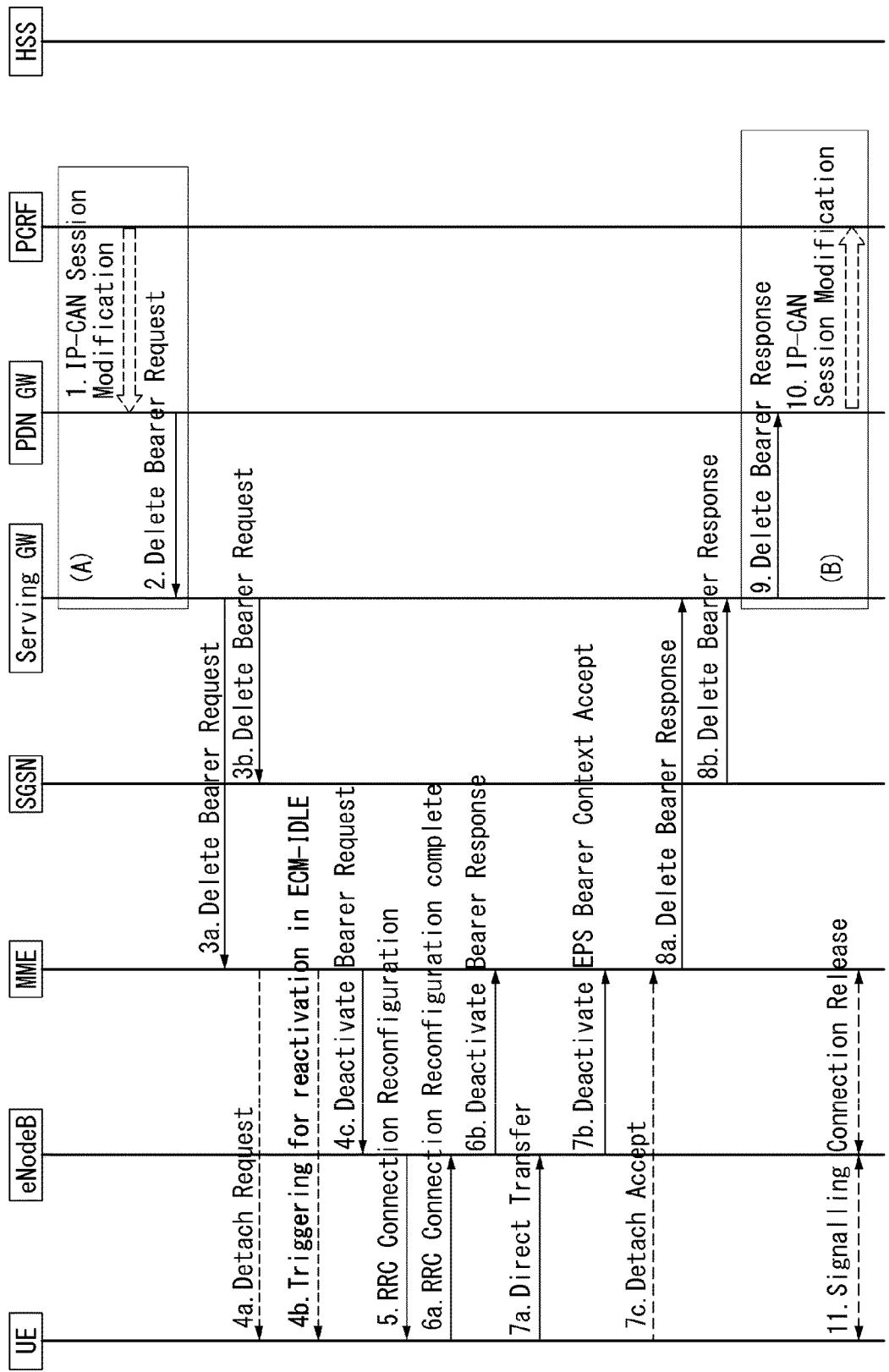
[FIG. 13]

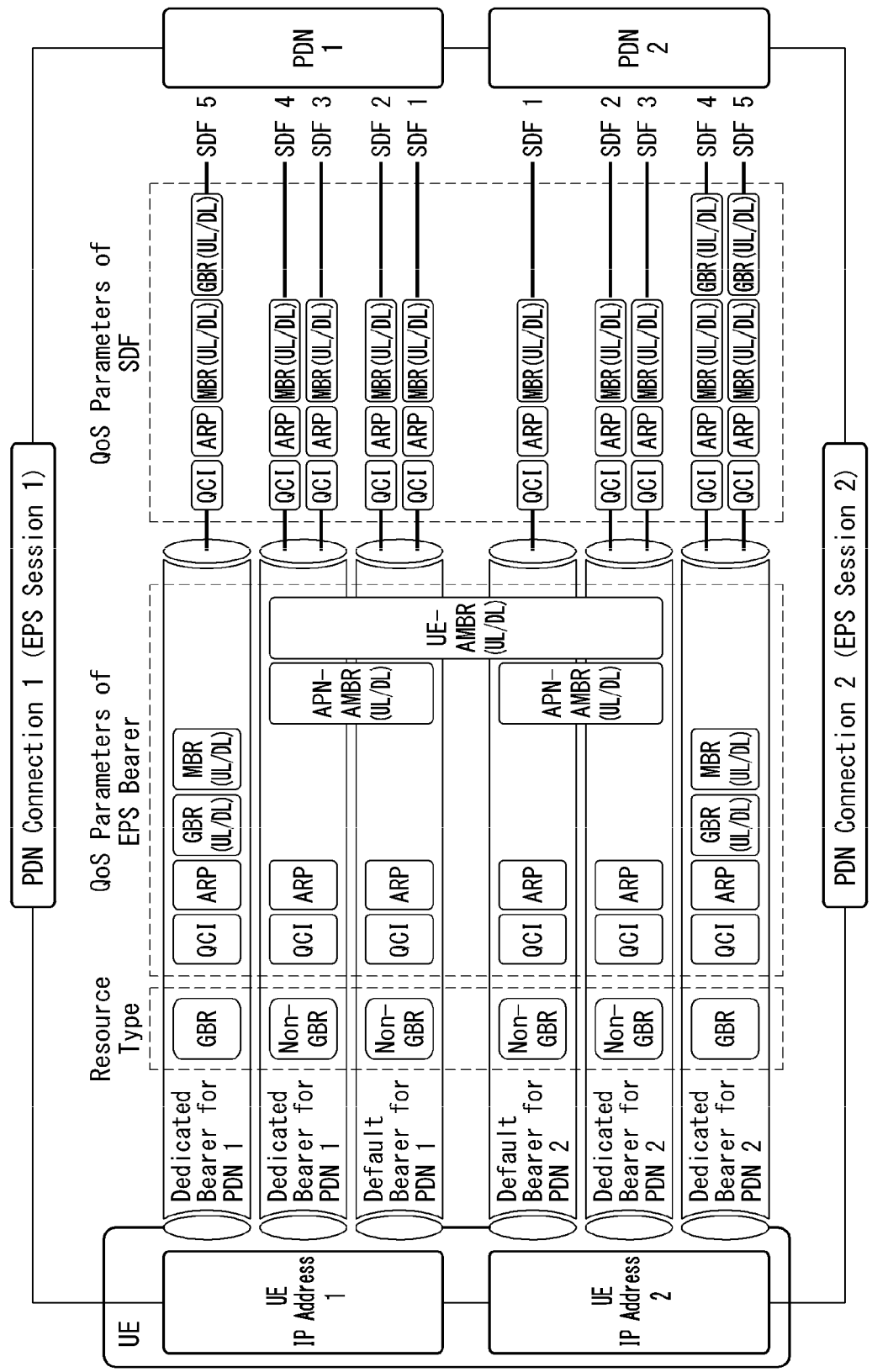
[FIG. 14]

[FIG. 15]
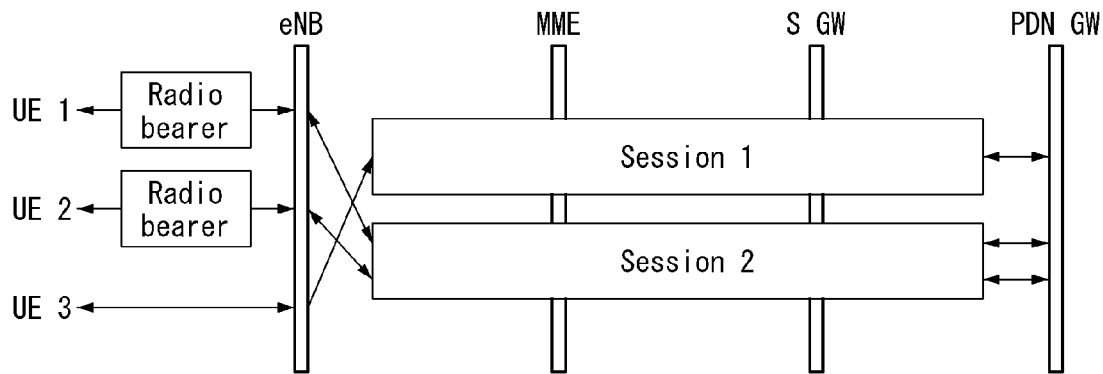
[FIG. 16]
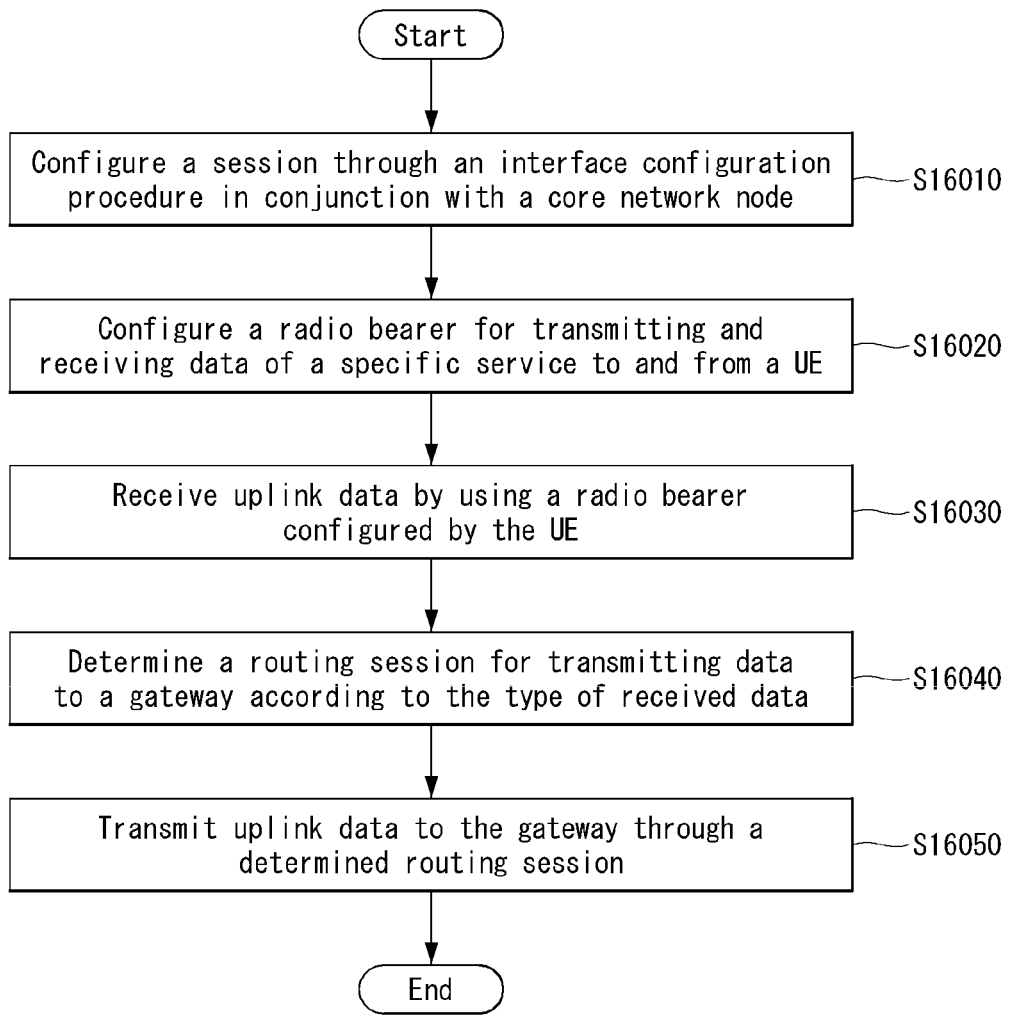

[FIG. 17]
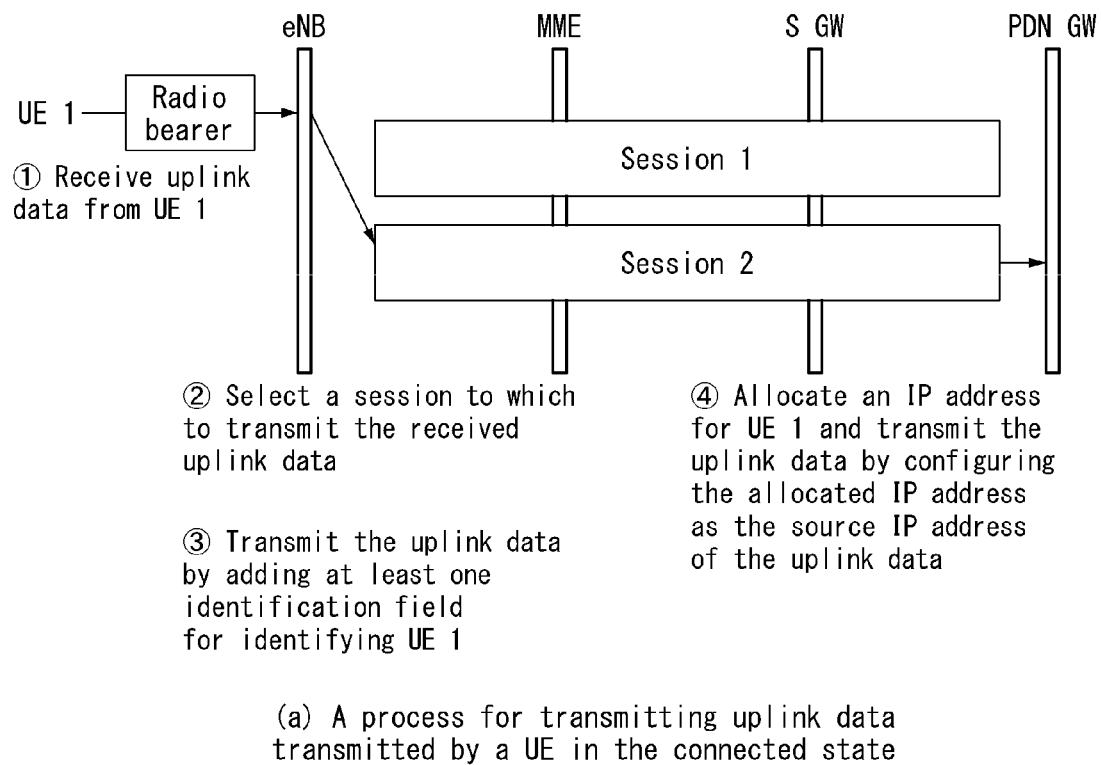
(a) A process for transmitting uplink data transmitted by a UE in the connected state
| eNB identifier | Gateway IP Address | UE identifier | .... | UE 1's UL Data |
|---|---|---|---|---|
(b) Packet format

[FIG. 18]
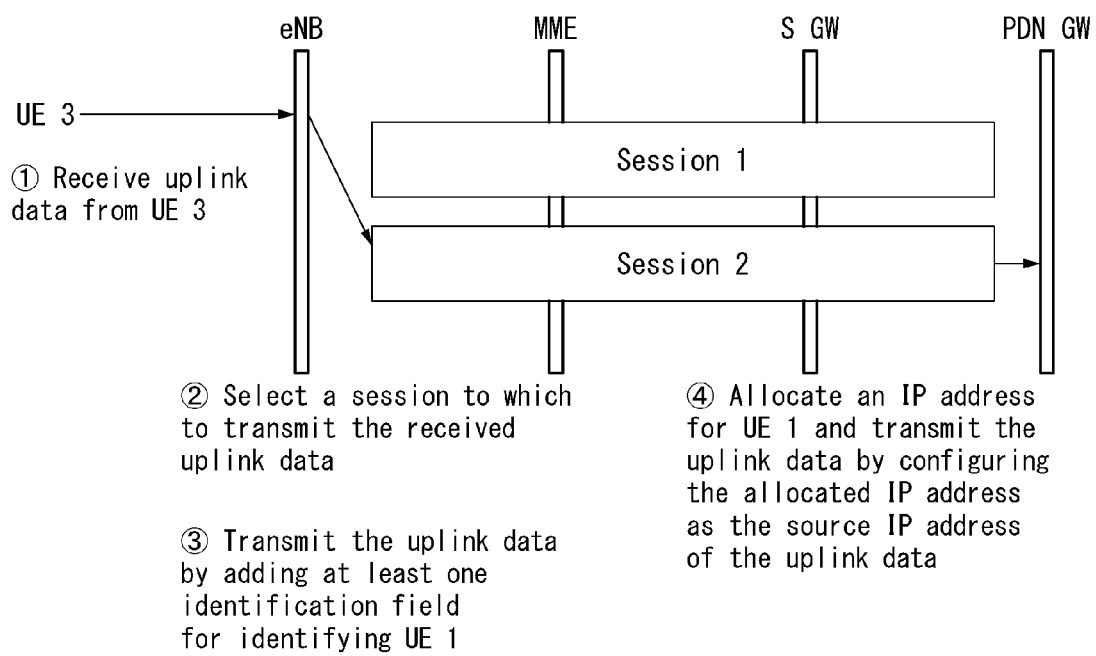
(a) A process for transmitting uplink data transmitted by a UE in the non-connected state
| eNB identifier | Gateway IP Address | UE identifier | .... | UE 3's UL Data |
(b) Packet format

[FIG. 19]
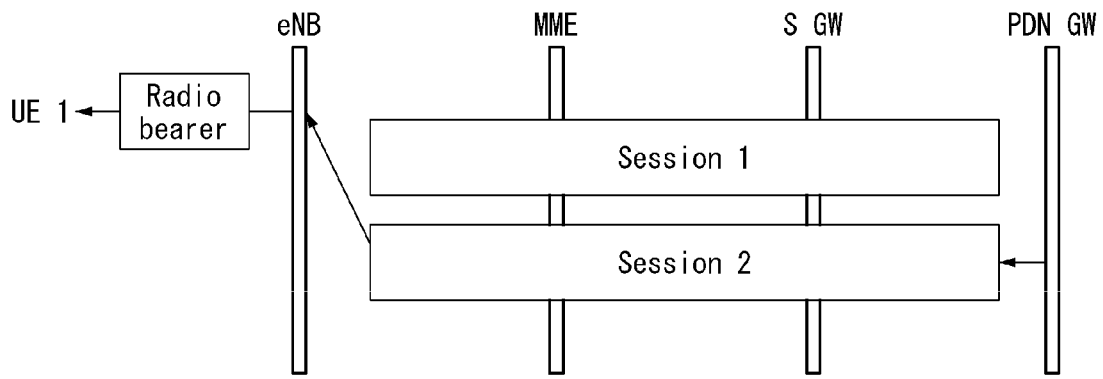
(a) A process for transmitting downlink data to a UE in the connected state
| Gateway IP Address | eNB identifier | UE identifier | .... | UE 1's DL Data |
|---|---|---|---|---|
(b) Packet format 【FIG. 20】
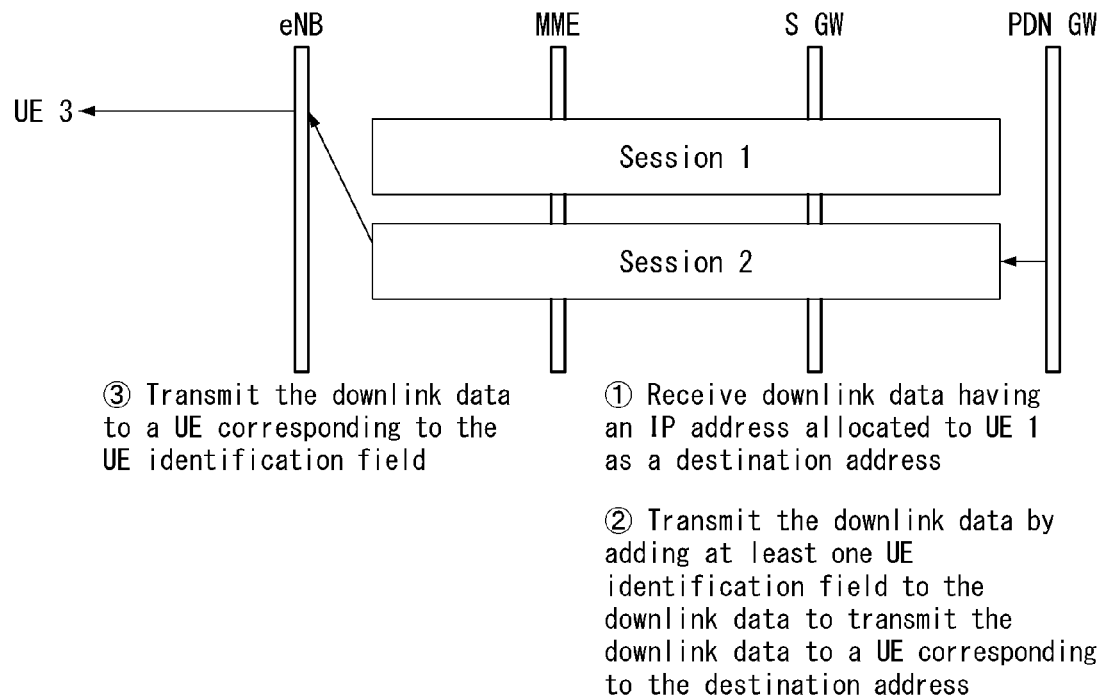
(a) A process for transmitting downlink data to a UE in the non-connected state
(b) Packet format

[FIG. 21]
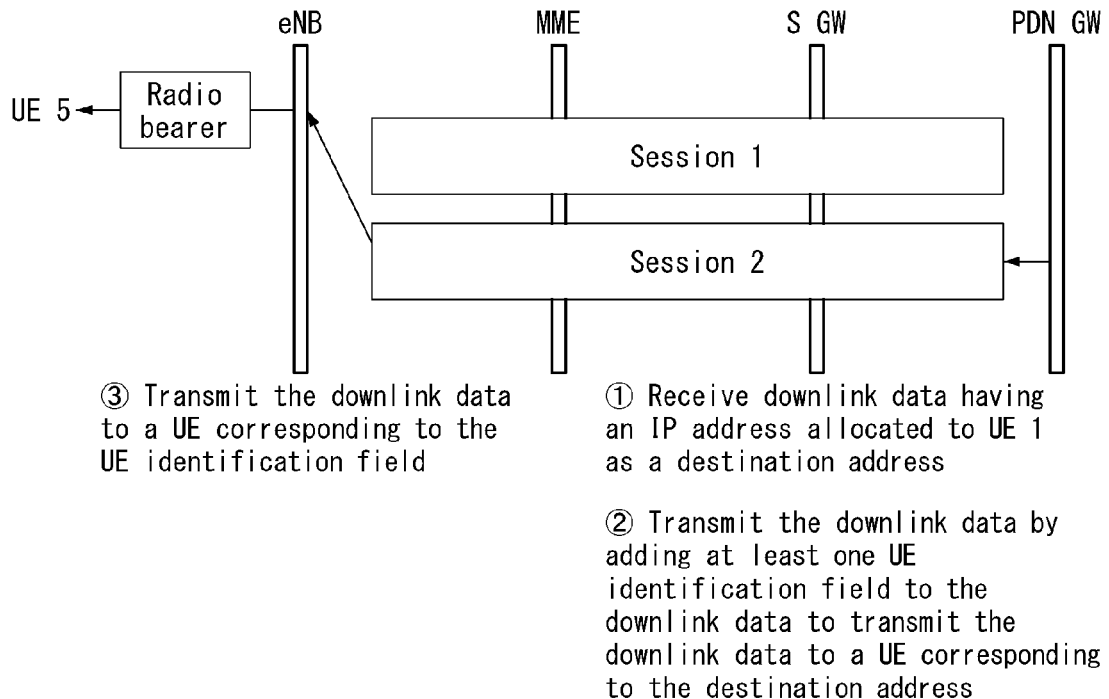
(a) A process for transmitting downlink data to a UE in the connected state
| Gateway IP Address | eNB identifier | UE identifier | .... | UE 5's DL Data |
(b) Packet format

[FIG. 22]
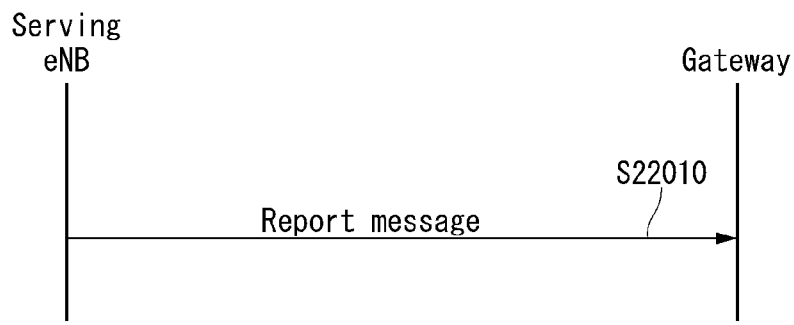
(a) Direct reporting for updating a UE identifier
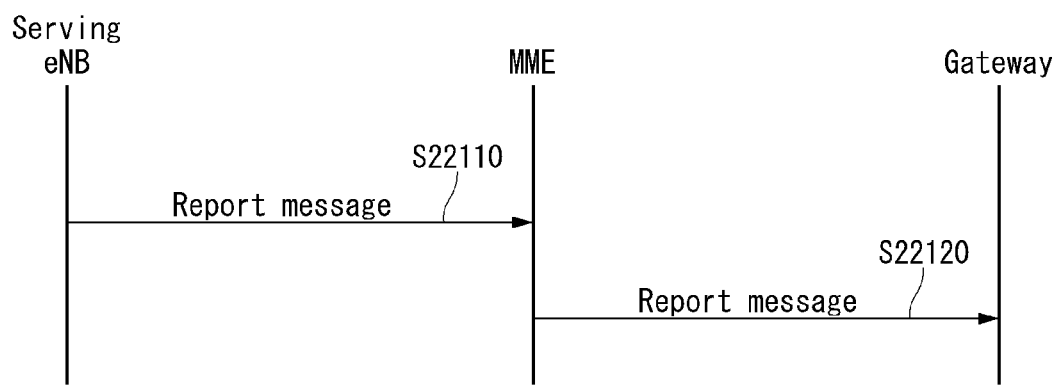
(b) Indirect reporting for updating a UE identifier

[FIG. 23]
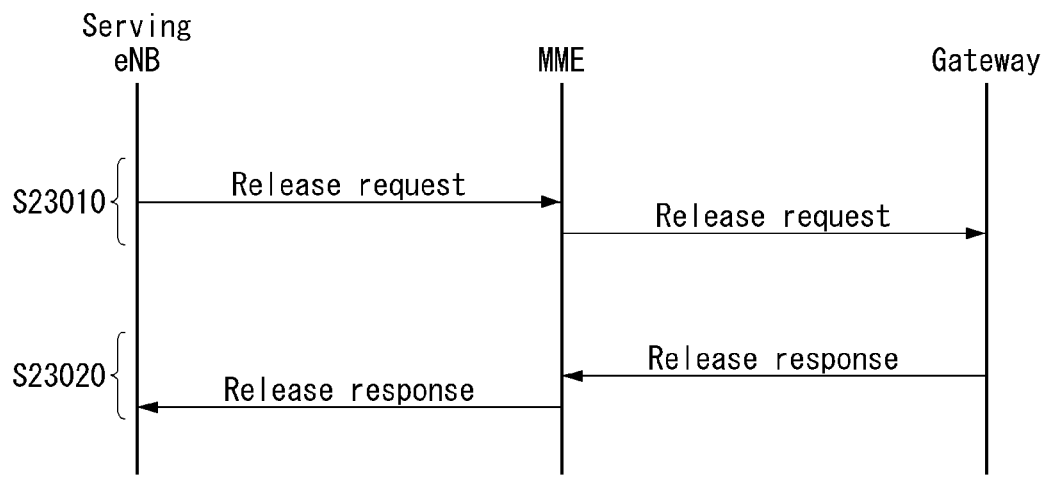
(a) A procedure for releasing an IP address triggered by an eNB
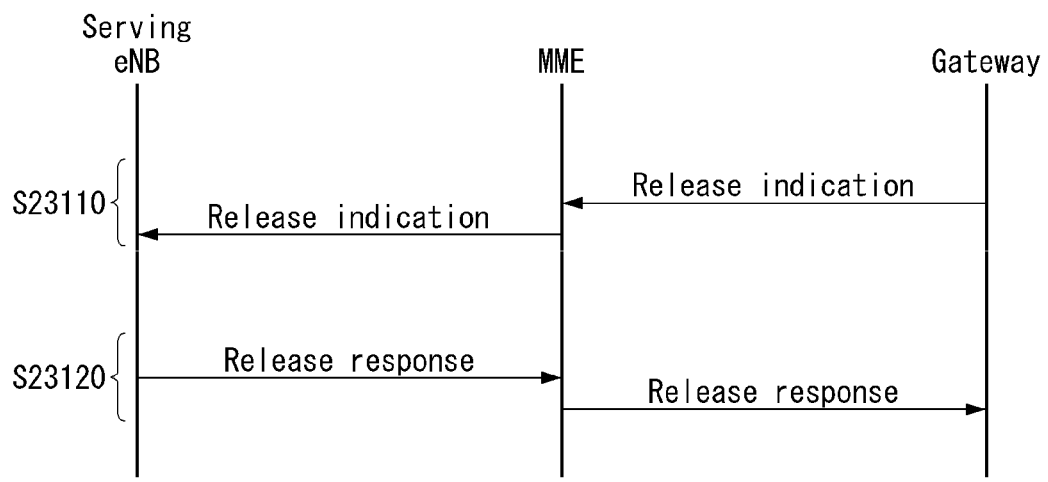
(b) A procedure for releasing an IP address triggered by a gateway

[FIG. 24]
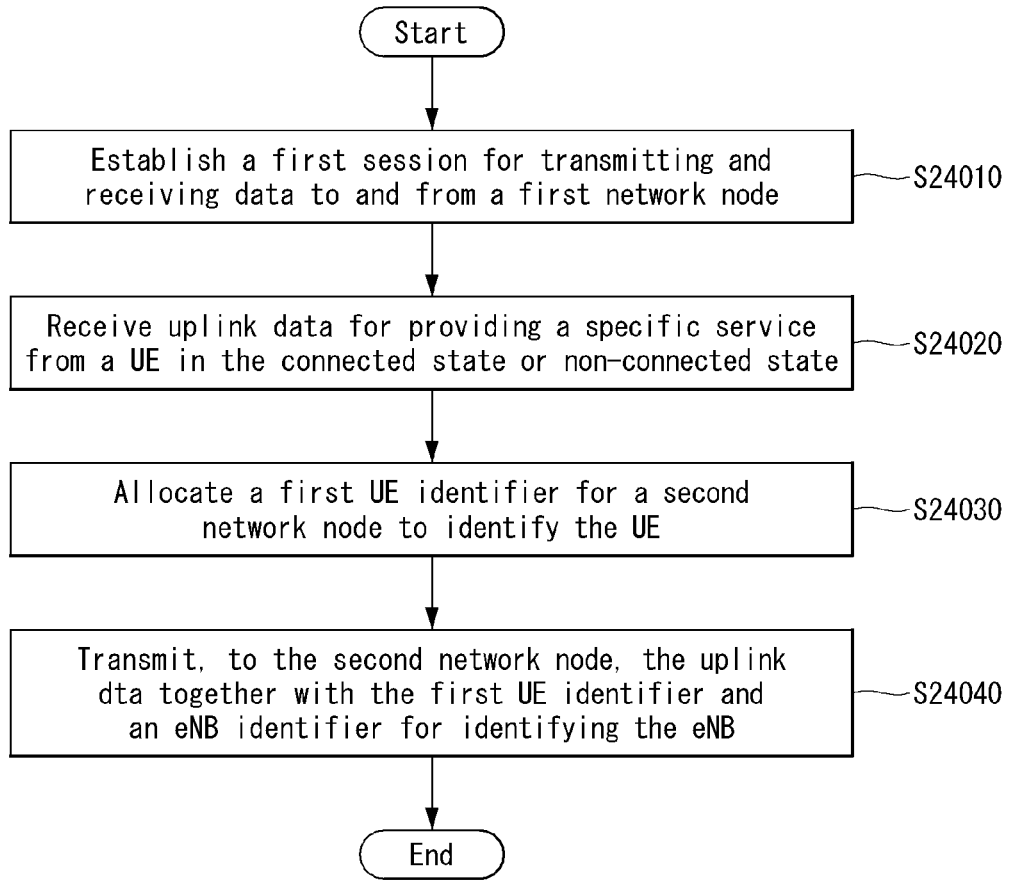
[FIG. 25]
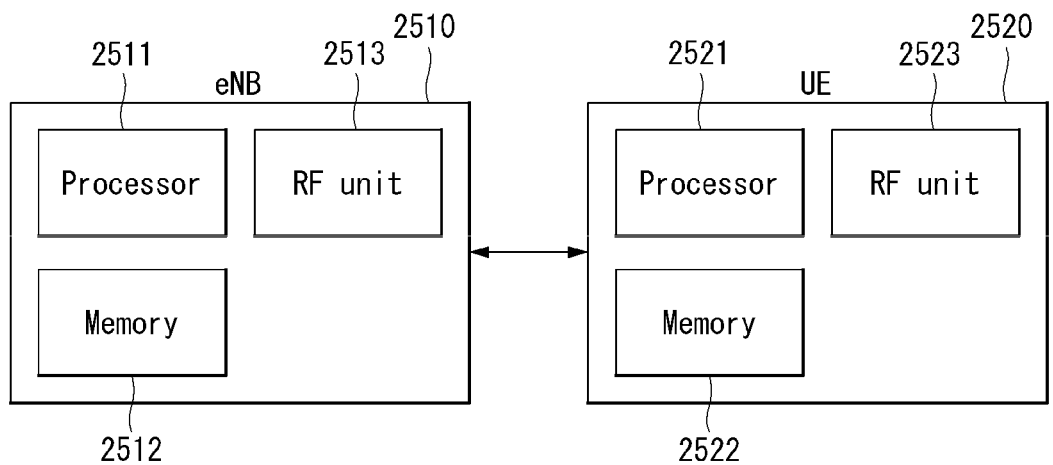

METHOD FOR TRANSMITTING/RECEIVING DATA IN WIRELESS COMMUNICATION SYSTEM AND APPARATUS SUPPORTING SAME

CROSS REFERENCE TO RELATED APPLICATIONS

This application is the National Phase of PCT International Application No. PCT/KR2017/006304, filed on Jun. 16, 2017, which claims priority under 35 U.S.C. 119(e) to U.S. Provisional Application No. 62/351,278, filed on Jun. 16, 2016, all of which are hereby expressly incorporated by reference into the present application.

TECHNICAL FIELD

The present invention is related to a method for transmitting and receiving data by a terminal in a wireless communication system and more particularly, a method for transmitting and receiving data by allocating a terminal identifier for identifying the terminal and an apparatus for supporting the method.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method and an apparatus for configuring a logical path for transmitting and receiving data according to Quality of Service (QoS) of a service.

Also, an object of the present invention is to provide a method and an apparatus for transmitting data through a preconfigured path without configuring a separate logical path or through part of the preconfigured path.

Also, an object of the present invention is to provide a method and an apparatus for transmitting a plurality of data having different required Quality of Service (QoS) through one logical path.

Also, an object of the present invention is to provide a method and an apparatus for configuring a radio bearer configured for each terminal to provide an emergency service between a base station and a terminal.

Also, an object of the present invention is to provide a method for configuring a session for transmitting and receiving data of a plurality of terminals requiring the same Quality of Service (QoS) between a base station and a network node; and an apparatus for supporting the method.

Also, when data are transmitted from a plurality of terminals through the same session, an object of the present invention is to provide a method for allocating identifiers for identifying terminals transmitting the data and an apparatus for supporting the method.

Also, an object of the present invention is to provide a method for updating an allocated identifier when mobility or state of a terminal is changed and an apparatus for supporting the method.

Technical objects to be achieved by the present invention are not limited to those described above. Other technical objects of the present invention may also be clearly understood from the descriptions given below by those skilled in the art to which the present invention belongs.

Technical Solution

To solve the technical problem above, the present invention provides a method and an apparatus for transmitting and receiving data in a wireless communication system.

More specifically, a method for transmitting and receiving data according to one embodiment of the present invention comprises establishing a first session for transmitting and receiving data to and from a first network node; receiving uplink data for providing a specific service from a UE in a connected or unconnected state; allocating a first UE identifier to identify the UE by a second network node; and transmitting the uplink data to the second network node together with the first UE identifier and a base station identifier for identifying the base station, wherein the first session is a wireless path for transmitting and receiving data with same service quality to and from a plurality of UEs.

Also, in the present invention, when the uplink data are transmitted through the first session, the first UE identifier is an identifier for the second network node to identify the UE that transmitted the uplink data.

Also, the method of the present invention further comprises establishing a second session for transmitting and receiving data of the specific service to and from the UE, wherein the uplink data are transmitted to the base station through the second session.

Also, in the present invention, the establishing a second session comprises receiving a connection request message for establishing the second session from the UE; and transmitting a connection response message in response to the connection request message.

Also, in the present invention, when the UE transmits the uplink data in an unconnected state, the uplink data are transmitted together with a first indicator, which indicates that the uplink data use the first session, and data type information of the uplink data.

Also, the method according to the present invention further comprises, when a specific event occurs, transmitting a report message for reporting update of the first UE identifier due to the specific event to a third network node which performs a function of controlling the second network node or a network node, wherein the specific event is one of handover of the UE, connected state transition of the UE, or release of a temporary UE identifier allocated to the UE; and the report message includes the first UE identifier.

Also, in the present invention, when the specific event is the handover, the report message further includes a target base station identifier for identifying a target base station and a second UE identifier allocated by the target base station.

Also, the method according to the present invention further comprises receiving downlink data from the second network node, wherein the downlink data are transmitted together with the first UE identifier and an IP address representing a destination of the downlink data.

Also, in the present invention, the IP address is allocated by the second network node based on the first UE identifier and the base station identifier.

Also, in the present invention, the IP address is released by an IP address release procedure in conjunction with the second network or when data of the UE are not transmitted or received through the first session for a specific time period.

Also, the present invention provides an apparatus comprising a communication unit for transmitting and receiving a radio signal to and from the outside; and a processor functionally linked to the communication unit, wherein the processor is configured to establish a first session for transmitting and receiving data to and from a first network node; receive uplink data for providing a specific service from a UE in a connected or unconnected state; allocate a first UE identifier for a second network node to identify the UE by a second network node; and transmit the uplink data to the second network node together with the first UE identifier and a base station identifier for identifying the base station, wherein the first session is a wireless path for transmitting and receiving data with same service quality to and from a plurality of UEs.

Advantageous Effects

The present invention transmits a plurality of data having different required Quality of Service (QoS) through one logical path, thereby reducing a delay caused when a separate logical path is configured according to each QoS.

Also, the present invention transmits a plurality of data having different required Quality of Service (QoS) through one logical path, thereby reducing signaling for configuring a separate logical path for each QoS.

Also, when data of a plurality of UEs are transmitted and received through the same session, the present invention allocates UE identifiers for the respective UEs, thereby identifying a source UE and a destination UE for the data to be transmitted and received.

Also, when mobility or state of a UE is changed, the present invention updates an identifier of the UE, thereby transmitting and receiving data by identifying the UE according to its location or state.

Also, the present invention transmits a plurality of data having the same or different Quality of Service through one logical path, thereby reducing resources for managing logical paths.

The advantageous effect that may be achieved from the present invention are not limited to those described above, and it should be clearly understood by those skilled in the art to which the present invention belongs that other effects not mentioned in this document may be achieved from the descriptions given below.

DESCRIPTION OF DRAWINGS

FIG. 1 illustrates one example of an Evolved Packet System (EPS) related to the LTE system to which the present invention may be applied.

FIG. 2 illustrates a wireless communication system to which the present invention is applied.

FIG. 3 is a block diagram illustrating one example of a functional split between E-UTRAN and EPC to which the present invention may be applied.

FIG. 4 is a block diagram showing an example of radio protocol architecture to which the technical characteristics of the present invention may be applied.

FIG. 5 is a flow diagram illustrating a process for establishing an RRC connection to which the present invention may be applied.

FIG. 6 is a flow diagram illustrating a process for reconfiguring an RRC connection to which the present invention may be applied.

FIG. 7 illustrates one example of a random access procedure in the LTE system.

FIG. 8 illustrates an EMM and ECM states in a wireless communication system to which the present invention may be applied.

FIG. 9 is a diagram illustrating a bearer structure in a wireless communication system to which the present invention may be applied.

FIG. 10 is a diagram illustrates a transmission path of a control plane and a user plane in an EMM registration state in a wireless communication system to which the present invention may be applied.

FIG. 11 illustrates one example of a default bearer activation procedure.

FIG. 12 illustrates one example of a dedicated bearer deactivation procedure.

FIG. 13 illustrates one example of a dedicated bearer deactivation procedure.

FIG. 14 illustrates one example of a parameter set for Quality of Service (QoS) management.

FIG. 15 illustrates one example of a method for transmitting and receiving data of a plurality of UEs by establishing a session proposed by the present specification.

FIG. 16 is a flow diagram illustrating one example of a method for transmitting and receiving data of a plurality of UEs by configuring a session proposed by the present specification.

FIG. 17 illustrates one example of a method for transmitting and receiving uplink data by configuring a session proposed by the present specification.

FIG. 18 illustrates another one example of a method for transmitting and receiving uplink data by configuring a session proposed by the present specification.

FIG. 19 illustrates one example of a method for transmitting and receiving downlink data by configuring a session proposed by the present specification.

FIG. 20 illustrates another one example of a method for transmitting and receiving downlink data by configuring a session proposed by the present specification.

FIG. 21 illustrates yet another one example of a method for transmitting and receiving downlink data by configuring a session proposed by the present specification.

FIG. 22 is a flow diagram illustrating one example of a method for updating an identifier of a UE proposed by the present specification.

FIG. 23 is a flow diagram illustrating one example of a method for releasing an IP address of a UE proposed by the present specification.

FIG. 24 is a flow diagram illustrating one example of a method for a base station to transmit and receive data of a UE by configuring a session proposed by the present specification.

FIG. 25 illustrates one example of an internal block diagram of a wireless apparatus to which the present invention may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device', 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment.

In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE) 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

FIG. 2 illustrates a wireless communication system to which the present invention is applied.

The system may also be called an Evolved-UMTS Terrestrial Radio Access Network (E-UTRAN) or Long Term Evolution (LTE)/LTE-A system.

The E-UTRAN includes base stations (BSs) 20 which provide a control plane and a user plane to a User Equipment (UE) 10.

The base stations 20 may be interconnected by means of an X2 interface. The base stations 20 are connected to the Evolved Packet Core (EPC) by means of an S1 interface, more specifically, to the Mobility Management Entity (MME) by means of an S1-MME and connected to the Serving Gateway (S-GW) by means of S1-U interface.

The EPC comprises MME, S-GW, and Packet Data Network-Gateway (P-GW). The MME provides connection information or capability information of a UE, which is mostly used for mobility management of the UE. The S-GW is a gateway having the E-UTRAN as a terminating node, and the P-GW is a gateway having the PDN as a terminating node.

Layers of a radio interface protocol between the UE and the network may be classified into a first layer (L1), a second layer (L2), and a third layer (L3) based on the lower three layers of the Open System Interconnection (OSI) reference model well known in the communication systems; a physical layer belonging to the first layer provides an information transfer service using a physical channel, and the Radio Resource Control (RRC) layer belonging to the third layer performs the role of controlling radio resources between the UE and the network. To this purpose, the RRC layer exchanges RRC messages between the UE and the base station.

FIG. 3 is a block diagram illustrating one example of a functional split between E-UTRAN and EPC to which the present invention may be applied.

Referring to FIG. 3, the hatched blocks belong to the radio protocol layer, and the unfilled blocks represent functional entities of the control plane.

A base station performs the following functions: (1) Radio Resource Management (RRM) such as radio bearer control, radio admission control, connection mobility control, and dynamic resource allocation to a UE; (2) compression of the Internet Protocol (IP) header and encryption of user data streams; (3) routing of user plane data to the S-GW; (4) scheduling and transmission of paging messages; (5) scheduling and transmission of broadcast information; and (6) measurement for mobility and scheduling and configuration of a measurement report.

The MME performs the following functions: (1) distribution of paging messages across base stations; (2) security control; (3) idle state mobility control; (4) SAE bearer control; and (5) ciphering and integrity protection of Non-Access Stratum (NAS) signaling.

The S-GW performs the following functions: (1) termination of user plane packets with respect to paging and (2) user plane switching for supporting mobility of the UE.

FIG. 4 is a block diagram showing an example of radio protocol architecture to which the technical characteristics of the present invention may be applied.

FIG. 4(a) shows an example of radio protocol architecture for a user plane, and FIG. 4(b) is a block diagram showing an example of radio protocol architecture for a control plane.

The user plane is a protocol stack for user data transmission, and the control plane is a protocol stack for control signal transmission.

Referring to FIGS. 4(a) and 4(b), a physical (PHY) layer provides information transfer service to a higher layer using a physical channel. The physical layer is connected to a medium access control (MAC) layer, that is, a higher layer, through a transport channel. Data is moved between the MAC layer and the physical layer through the transport channel. The transport channel is classified depending on how data is transmitted through a radio interface according to which characteristics.

Data is moved through a physical channel between different physical layers, that is, the physical layers of a transmitter and a receiver. The physical channel may be modulated according to an orthogonal frequency division multiplexing (OFDM) scheme, and uses time and a frequency as radio resources.

The function of the MAC layer includes mapping between a logical channel and a transport channel and multiplexing/demultiplexing (the meaning of "/" includes both the concepts of "or" and "and") to a transport block provided to a physical channel on the transport channel of an MAC service data unit (SDU) that belongs to a logical channel. The MAC layer provides service to a radio link control (RLC) layer through the logical channel.

The function of the RLC layer includes the concatenation, segmentation and reassembly of an RLC SDU. In order to guarantee various quality of services (QoS) required by a radio bearer (RB), the RLC layer provides three operating modes; a transparent mode (TM), an unacknowledged mode (UM) and an acknowledged mode (AM). AM RLC provides error correction through an automatic repeat request (ARQ).

A radio resource control (RRC) layer is defined only in the control plane. The RRC layer is related to the configuration, re-configuration and release of radio bearers and is responsible for control of the logical channel, transport channel and physical channels. An RB means a logical path provided by the first layer (PHY layer) and the second layer (MAC layer, RLC layer, and PDCP layer) for the transfer of data between a user equipment and a network.

The function of a packet data convergence protocol (PDCP) layer in the user plane includes the transfer, header compression and ciphering of user data. The function of a packet data convergence protocol (PDCP) in the control plane includes the transfer and ciphering/integrity protection of control plane data.

What an RB is configured means a process of defining the characteristics of a radio protocol layer and channel in order to provide a specific service and configuring each detailed parameter and operating method. An RB may be divided into two types of a signaling RB (SRB) and a data RB (DRB). The SRB is used as a passage for transmitting an RRC message in the control plane, and the DRB is used as a passage for transmitting user data in the user plane.

When an RRC connection is established between the RRC layer of a user equipment and the RRC layer of an E-UTRAN, the user equipment is in the RRC connected state. If not, the user equipment is in the RRC idle state.

A downlink transport channel through which a network transmits data to a user equipment includes a broadcast channel (BCH) through which system information is transmitted and a downlink shared channel (SCH) through which user traffic or a control message is transmitted. The traffic of a downlink multicast or broadcast service or a control message may be transmitted through a downlink SCH or may be transmitted through a separate downlink multicast channel (MCH). Meanwhile, an uplink the transport channel through a user equipment transmits data to a network includes a random access channel (RACH) through which an initial control message is transmitted and an uplink shared channel (SCH) through which user traffic or a control message is transmitted.

A logical channel located higher than a transport channel and mapped to the transport channel includes a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. A resource block is a resource allocation unit and consists of a plurality of OFDM symbols and a plurality of subcarriers. Furthermore, each subframe may use specific subcarriers of specific OFDM symbols (e.g., first OFDM symbol) of the corresponding subframe for a physical downlink control channel (PDCCH), that is, an L1/L2 control channel. A transmission time interval (TTI) is a unit time of subframe transmission.

Hereinafter, an RRC state of a UE and RRC connection procedure are described.

An RRC state indicates whether an RRC layer of the UE is logically connected to an RRC layer of the E-UTRAN. When an RRC connection is established between the RRC layer of the UE and the RRC layer of the E-UTRAN, the UE is said to be in the RRC_CONNECTED state, and otherwise the UE is said to be in the RRC_IDLE state. Since the UE in the RRC_CONNECTED state has an RRC connection, the E-UTRAN may recognize existence of the UE in unit of a cell and therefore may effectively control the UE.

Meanwhile, the UE in the RRC_IDLE state may not be recognized by the E-UTRAN, and a core network (CN) manages the UE in unit of a tracking area (TA) which is larger than a cell. That is, existence of the UE in the RRC_IDLE state is recognized only in unit of a large area, and the UE has to transition to the RRC_CONNECTED state to receive a typical mobile communication service such as voice or data communication.

When the user initially powers on the UE, the UE first searches for a proper cell and then remains in the RRC_IDLE state in the corresponding cell. The UE in the RRC_IDLE state establishes an RRC connection with the E-UTRAN through an RRC connection procedure only when there is a need to establish an RRC connection and then transitions to the RRC_CONNECTED state. The UE which remains in the RRC_IDLE state establishes an RRC connection with the E-UTRAN for various cases; for example, when uplink data transmission is necessary due to a user's call attempt or when there is a need to transmit a response message upon receiving a paging message from the E-UTRAN.

The Non-Access Stratum (NAS) layer located on top of the RRC layer performs the function of session management and mobility management.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the corresponding network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state.

When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If location of the UE in the ECM-IDLE state changes from the location known to the network, the UE reports its corresponding location to the network through a tracking area update procedure.

Next, system information will be described.

System information includes essential information that a UE has to know to connect to a base station. Therefore, a UE has to receive all the system information before connecting to a base station and has to be aware of the most recent system information. And since the system information is the kind of information that all of the UEs belonging to a cell have to know, the base station transmits the system information periodically.

According to the clause 5.2.2 of the 3GPP TS 36.331 V8.7.0 (2009-09) "Radio Resource Control (RRC); Protocol specification (Release 8)", the system information is classified into Master Information Block (MIB), Scheduling Block (SB), and System Information Block (SIB). An MIB allows a UE to know the physical structure of the corresponding cell, for example, bandwidth. An SB informs of transmission information of SIBs, for example, transmission period. The SIB is a set of inter-related system information. For example, some SIB includes only the information about adjacent cells while some other SIB includes only the information of an uplink radio channel used by a UE.

FIG. 5 is a flow diagram illustrating a process for establishing an RRC connection to which the present invention may be applied.

A UE transmits an RRC connection request message requesting an RRC connection to the network S5010. The network transmits an RRC connection setup message in response to the RRC connection request S5020. After receiving the RRC connection setup message, the UE transitions to the RRC connection mode.

The UE transmits, to the network, an RRC connection setup complete message used for confirming successful completion of establishing an RRC connection.

FIG. 6 is a flow diagram illustrating a process for reconfiguring an RRC connection to which the present invention may be applied.

RRC connection reconfiguration is used for modifying an RRC connection. RRC connection reconfiguration is used for establishing/modifying/releasing a radio bearer (RB), performing handover, and setting up/modifying/releasing measurement.

The network transmits an RRC connection reconfiguration message for modifying an RRC connection to the UE S6010. In response to the RRC connection reconfiguration, the UE transmits, to the network, an RRC connection reconfiguration complete message used for confirming successful completion of RRC connection reconfiguration S6020.

Random Access Channel (RACH) Procedure

FIG. 7 illustrates one example of a random access procedure in the LTE system.

The RACH procedure is performed at the initial access in the RRC_IDLE state, at the initial access after a radio link failure, during handover requiring the RACH procedure, and at the occurrence of uplink or downlink data requiring the RACH procedure in the RRC_CONNECTED state. Part of RRC messages such as an RRC connection request message, cell update message, and UTRAN registration area (URA) update message may also be transmitted by means of the RACH procedure. A logical common control channel (CCCH), dedicated control channel (DCCH), and dedicated traffic channel (DTCH) may be mapped to a transmission channel RACH. The transmission RACH is mapped to a physical random access channel (PRACH).

If the MAC layer of the UE instructs the physical layer of the UE to perform PRACH transmission, the physical layer of the UE first selects one access slot and one signature and transmits a PRACH preamble upward. The RACH procedure is divided into a contention-based RACH procedure and a non-contention based RACH procedure.

FIG. 7(a) illustrates one example of a contention-based RACH procedure, and FIG. 7(b) illustrates one example of a non-contention based RACH procedure.

First, the contention-based RACH procedure will be described with reference to FIG. 7(a).

The UE receives information about random access from a base station through system information and stores the received information. Afterwards, when random access is needed, the UE transmits a random access preamble (which is also called message 1) to the base station S7010.

If the base station receives a random access preamble from the UE, the base station transmits a random access response message (which is called a message 2) to the UE S7020. More specifically, downlink scheduling information with respect to the random access response message may be CRC-masked with a random access-ratio network temporary identifier (RA-RNTI) and transmitted on an L1 or L2 control channel (PDCCH). The UE, which has received a downlink scheduling signal masked with the RA-RNTI, may receive a random access response message from a physical downlink shared channel (PDSCH) and decode the received random access response message. Afterwards, the UE checks the random access response message about whether there exists random access response information directed to the UE.

Existence of random access response information directed to the UE may be checked by means of whether there exists a random access preamble ID (RAID) in the preamble that the UE has transmitted.

The random access response information includes timing alignment (TA) representing timing offset information for synchronization, wireless resource allocation information used for uplink transmission, and a temporary identifier for identification of a UE (for example, temporary C-RNTI).

When receiving random access response information, the UE performs uplink transmission (which is also called message 3) on an uplink shared channel (SCH) according to the wireless resource allocation information included in the response message S7030. At this time, uplink transmission may also be called scheduled transmission.

After receiving the uplink transmission from the UE, the base station transmits a message for contention resolution (which is also called message 4) to the UE through a downlink shared channel (DL-SCH) S7040.

Next, the non-contention based random access procedure will be described with reference to FIG. 7(b).

Before the UE transmits a random access preamble, the base station allocates a non-contention random access preamble to the UE S7110.

The non-contention random access preamble may be allocated through a handover command or dedicated signaling channel such as a PDCCH. When a non-contention random access preamble is allocated to the UE, the UE transmits a non-contention random access preamble to the base station S7120.

Afterwards, the base station may transmit a random access response (which is also called message 2) to the UE similarly to the S2002 step of the contention-based random access procedure S7130.

Although HARQ is not applied for a random access response during the random access procedure above, HARQ may still be applied for uplink transmission with respect to a random access response or for a message for contention resolution. Therefore, the UE doesn't have to transmit ACK or NACK for a random access response.

Next, UL data transmission method in the LTE(-A) or 802.16 will be described briefly.

A cellular system such as the LTE(-A) or 802.16m system uses a resource allocation method based on base station scheduling.

In a system which employs a resource allocation method based on base station scheduling, a UE having data to transmit (namely UL data) requests resources for transmission of the corresponding data from a base station before transmitting the data.

The scheduling request from the UE as described above may be performed by means of transmission of a scheduling request (SR) to a PUCCH or transmission of a buffer status report (BSR) to a PUSCH.

Also, when resources for transmitting an SR or a BSR are not allocated to the UE, the UE may request uplink resources from the base station through the RACH procedure.

As described above, the base station which has received a scheduling request from the UE allocates uplink resources to be used by the UE through a downlink control channel (namely a UL grant message or DCI in the case of the LTE(-A)).

At this time, a UL grant transmitted to the UE may explicitly signal to inform of which subframe the resource allocated to the UE corresponds but may define an appointed time between the UE and the base station as resource allocation for a subframe after a specific time (for example, 4 ms in the case of the LTE).

As described above, allocation of resources by the base station to the UE after X ms (for example, in the case of the LTE(-A), 4 ms) indicates that resources for the UE are allocated by taking into account the total time required for the UE to receive and decode a UL grant and to prepare and encode data to be transmitted.

EMM and ECM State

Now, an EPS mobility management state and an EPS connection management state will be described.

FIG. 8 illustrates an EMM and ECM states in a wireless communication system to which the present invention may be applied.

Referring to FIG. 8, to manage mobility of a UE in the NAS layer located in the control plane of the UE and an MME, an EMM-REGISTERED and EMM-DEREGISTERED states may be defined according to whether a UE has been attached to or detached from the network. The EMM-REGISTERED state and the EMM-DEREGISTERED state may be applied to the UE and the MME.

Initially, a UE stays in the EMM-DEREGISTERED state like when the UE is powered on for the first time, and to connect to a network, the UE performs a process for registering to the corresponding network through an initial attach procedure. When the attach procedure is successfully completed, the UE and the MME transition to the EMM-REGISTERED state. Also, when the UE is powered off or in the case of a radio link failure (when a packet error rate exceeds a threshold on a radio link), the UE is detached from the network and transitions to the EMM-DEREGISTERED state.

Also, to manage a signaling connection between the UE and the network, an ECM-CONNECTED and an ECM-IDLE state may be defined. The ECM-CONNECTED and ECM-IDLE state may also be applied to the UE and the MME. An ECM connection is composed of an RRC connection configured between the UE and the base station; and an S1 signaling connection configured between the base station and the MME. In other words, that an ECM connection has been configured/released indicates that both of the RRC connection and the S1 signaling connection have been configured/released.

An RRC state indicates whether an RRC layer of the UE and an RRC layer of the base station are connected logically to each other. In other words, when the RRC layer of the UE is connected to the RRC layer of the base station, the UE remains in the RRC_CONNECTED state. On the other hand, when the RRC layer of the UE is not connected to the RRC layer of the base station, the UE remains in the RRC_IDLE state.

The network may determine the presence of user equipment in the ECM-CONNECTED state on a cell-by-cell basis and may effectively control the user equipment.

In contrast, the network cannot check the presence of the user equipment in the ECM-IDLE state, and a core network (CN) manages the user equipment in a tracking area unit, that is, an area unit larger than a cell. When the user equipment is in the ECM idle state, the user equipment performs discontinuous reception (DRX) configured by NAS using an ID uniquely allocated in a tracking area. That is, the user equipment may receive the broadcasting of system information and paging information by monitoring a paging signal at a specific paging occasion every user equipment-specific paging DRX cycle.

Furthermore, when the user equipment is in the ECM-IDLE state, the network does not have context information of the user equipment. Accordingly, the user equipment in the ECM-IDLE state may perform a user equipment-based mobility-related procedure, such as cell selection or cell reselection, without a need to receive a command from the network. If the location of the user equipment in the ECM idle state is different from that known to the network, the user equipment may notify the network of the location of the corresponding user equipment through a tracking area update (TAU) procedure.

In contrast, when the user equipment is in the ECM-CONNECTED state, the mobility of the user equipment is managed by a command from the network. In the ECM-CONNECTED state, the network is aware of a cell to which the user equipment belongs. Accordingly, the network may transmit and/or receive data to the user equipment or from the user equipment, may control mobility, such as handover of the user equipment, and may perform cell measurement for a neighboring cell.

As described above, in order for a user equipment to receive a common mobile communication service such as voice or data, the user equipment must shift to the ECM-CONNECTED state. At the initial stage, such as a case where the user equipment is first powered on, the user equipment is in the ECM-IDLE state like the EMM state. When the user equipment is successfully registered with a corresponding network through an initial attach procedure, the user equipment and an MME make transition to the ECM connected state. Furthermore, if the user equipment has been registered with the network, but a radio resource has not been allocated because traffic has been deactivated, the user equipment is in the ECM-IDLE state. When uplink or downlink new traffic is generated in the corresponding user equipment, the user equipment and the MME make transition to the ECM-CONNECTED state through a service request procedure.

FIG. 9 is a diagram illustrating a bearer structure in a wireless communication system to which the present invention may be applied.

When a UE is connected to a Packet Date Network (PDN), a PDN connection is generated, and the PDN connection may also be called an EPS session. A PDN is an internet protocol network which is exterior or interior of a service provider, and provides a service function such as an internet or IP Multimedia Subsystem (IMS).

The EPS session has one or more EPS bearer. The EPS bearer is the transmission path of traffic generated between a user equipment and a PDN GW in order for the EPS to transfer user traffic. One or more EPS bearers may be configured per user equipment.

Each EPS bearer may be divided into an E-UTRAN radio access bearer (E-RAB) and an S5/S8 bearer. The E-RAB may be divided into a radio bearer (RB) and an S1 bearer. That is, the EPS bearers correspond to the RB, S1 bearer, and S5/S8 bearer, respectively.

The E-RAB transfers the packet of an EPS bearer between a user equipment and an EPC. If the E-RAB is present, the E-RAB bearer and the EPS bearer are mapped in a one-to-one manner. A data radio bearer (DRB) transfers the packet of the EPS bearer between the user equipment and an eNB. If the DRB is present, the DRB and the EPS bearer/E-RAB are mapped in a one-to-one manner. The S1 bearer transfers the packet of the EPS bearer between the eNB and the S-GW. The S5/S8 bearer transfers an EPS bearer packet between the S-GW and the P-GW.

The user equipment binds a service data flow (SDF) to the EPS bearer of an uplink direction. The SDF is an IP flow or a gathering of IP flows in which user traffic has been classified (or filtered) for each service. A plurality of SDFs may be multiplexed with the same EPS bearer by including a plurality of uplink packet filters. The user equipment stores mapping information between an uplink packet filter and a DRB in order to bind the SDF and the DRB in the uplink.

The P-GW binds the SDF to the EPS bearer in a downlink direction. The plurality of SDFs may be multiplexed with the same EPS bearer by including a plurality of downlink packet filters. The P-GW stores mapping information between the downlink packet filters and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A user equipment may have one default bearer or one or more dedicated bearers per PDN. The least default bearer having an EPS session with respect to one PDN is called a default bearer.

The EPS bearer may be classified based on an identity. The EPS bearer identity is allocated by a user equipment or an MME. The dedicated bearer(s) is combined with a default bearer by a linked EPS bearer identity (LBI).

When a user equipment is initially attached to a network through an initial attach procedure, it receives an IP address allocated thereto and thus a PDN connection is generated. A default bearer is generated at the EPS interval. The default bearer is maintained without being released unless the PDN connection with the user equipment is terminated although there is no traffic between the user equipment and a corresponding PDN. When the corresponding PDN connection is terminated, the default bearer is also released. In this case, all of bearers in the interval forming a default bearer with the user equipment are not activated, but an S5 bearer having a direct connection with the PDN is maintained and E-RAB bearers (i.e., DRB and S1 bearer) associated with a radio resource are released. Furthermore, when new traffic is generated in the corresponding PDN, an E-RAB bearer is reconfigured to transfer traffic.

While a user equipment uses a service (e.g., Internet) through a default bearer, if the user equipment uses a service (e.g., video on demand (VoD)) insufficient to receive quality of service (QoS) using only the default bearer, a dedicated bearer when the user equipment demands the dedicated bearer. If there is no traffic of the user equipment, the dedicated bearer is released. A user equipment or a network may generate a plurality of dedicated bearers, if necessary.

An IP flow may have a different QoS characteristic depending on that a user equipment uses which service. When a network establishes/modifies an EPS session for the user equipment, it determines a control policy for the allocation of a network resource to QoS and applies it while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a user equipment. IP flows having the same QoS are mapped to the same SDF, and the SDF becomes a unit in which the PCC rule is applied.

A policy and charging control function (PCR) and a policy and charging enforcement function (PCEF) may correspond to main entities that perform such a PCC function.

The PCRF determines a PCC rule for each SDF when an EPS session is generated or changed and provides it to a P-GW (or PCEF). The P-GW configures the PCC rule for a corresponding SDF, detects an SDF every transmitted/received IP packet, and applies the PCC rule for the corresponding SDF. When the SDF is transmitted to a user equipment via the EPS, it is mapped to an EPS bearer capable of providing proper QoS according to a QoS rule stored in the P-GW.

The PCC rule is divided into a dynamic PCC rule and a predefined PCC rule. The dynamic PCC rule is dynamically provided from the PCRF to the P-GW when the EPS session is established/modified. In contrast, the predefined PCC rule is previously configured in the P-GW and activated/deactivated by the PCRF.

An EPS bearer is a basic QoS parameter and includes a QoS class identifier (QCI) and an allocation and retention priority (ARP).

The QCI is a scalar used as a criterion for accessing node-specific parameters that controls bearer level packet forwarding treatment. A scalar value is pre-configured by a network operator. For example, the scalar may be pre-configured as one of integer values 1 to 9.

A main object of an ARP is for determining whether the establishment or modification request of a bearer has to be accepted or rejected if a resource is restricted. Furthermore, the ARP may be used to determine whether which bearer(s) has to be dropped by an eNB in an exceptional resource restriction (e.g., handover) situation.

The EPS bearer is divided into a guaranteed bit rate (GBR) type bearer and a non-guaranteed bit rate (non-GBR) bearer according to a QCI resource form. A default bearer may be always a non-GBR type bearer, and a dedicated bearer may be a GBR type or non-GBR type bearer.

The GBR type bearer is a QoS parameter other than the QCI and the ARP and has the GBR and a maximum bit rate (MBR). The MBR means that a resource fixed for each bearer is allocated (guarantee a bandwidth). In contrast, the non-GBR type bearer is a QoS parameter other than the QCI and the ARP and has an aggregated MBR (AMBR). The AMBR means that a maximum bandwidth capable of being used along with another non-GBR type bearer is allocated without allocating a resource for a bearer.

If the QoS of the EPS bearer is determined as described above, the QoS of each bearer is determined for each interface. The bearer of each interface provides the QoS of the EPS bearer for each interface, and thus all of the EPS bearer, an RB, and S1 bearer have a one-to-one relation.

While a user equipment uses a service through a default bearer, if the user equipment uses a service incapable of receiving QoS using only the default bearer, a dedicated bearer is generated in response (on-demand) to a request from the user equipment.

FIG. 10 is a diagram illustrating the transmission path of a control plane and a user plane in an EMM registration state in a wireless communication system to which the present invention may be applied.

FIG. 10(*a*) illustrates an ECM-CONNECTED state, and FIG. 16(*b*) illustrates ECM-IDLE.

When a user equipment becomes the EMM-Registered state by successfully attaching to a network, it is provided with a service using an EPS bearer. As described above, the EPS bearer is divided into a DRB, an S1 bearer, and an S5 bearer for each interval.

As in FIG. 10(*a*), in the ECM-CONNECTED state having user traffic, an NAS signaling connection, that is, an ECM connection (i.e., RRC connection and S1 signaling connection), is established. Furthermore, an S11 GPRS tunneling protocol control plane (GTP-C) connection is established between the MME and SGW, and an S5 GTP-C connection is established between the SGW and the PDN GW.

Furthermore, in the ECM-CONNECTED state, all of the DRB, the S1 bearer and the S5 bearer are configured (i.e., radio or network resource allocation).

As in FIG. 10(*b*), in the ECM-IDLE state not having user traffic, the ECM connection (i.e., RRC connection and S1 signaling connection) is released. In this case, the establishment of the S11 GTP-C connection between the MME and the SGW and the establishment of the S5 GTP-C connection between the SGW and the PDN GW are maintained.

Furthermore, in the ECM-IDLE state, both the DRB and the S1 bearer are released, but the configuration (i.e., radio or network resource allocation) of the S5 bearer is maintained.

FIG. 11 illustrates one example of a default bearer activation procedure.

procedure by transmitting an activate default EPS bearer context request message to activate a default bearer and may transition to a bearer context active pending state S11010.

When a default bearer is activated as part of an attach procedure, the MME transmits the activate default EPS bearer context request message together with an attach accept message and may not start a T3485 timer.

When the attach procedure is skipped, and the default bearer is activated as a response to a stand-alone PDN connectivity request message, the MME transmits the activate default EPS bearer context request message alone and starts the T3485 timer.

The MME may allocate an EPS bearer identifier and include the allocated identifier in the activate default EPS bearer context request message. The MME obtains PTI from the PDN connectivity request and include the obtained PTI in the activate default EPS bearer context request message.

Both of the network identifier part and the operator identifier part may be included in the access point name IE.

After receiving the activate default EPS bearer context request message, if a timer for an APN indicated by the message is operating, the UE may stop the T3396 timer, transmit an activate default EPS bearer context accept message, and transition to a bearer context active state S11020.

When the default bearer is activated as part of the attach procedure, the UE may transmit an activate default EPS bearer context accept message together with an attach complete message.

When the default bearer is activated as a response of the stand-alone PDN connectivity request message, the UE may transmit an activate default EPS bearer context accept message alone.

If a WLAN offload indication information element is included in the activate default EPS bearer context request message, the UE may store the WLAN offload acceptability values for PDN connection and use the E-UTRAN offload acceptability value to determine whether the PDN connection is offloadable.

To identify a UE requested PDN connectivity procedure related to the default bearer context activation, the UE may check PTI of the activate default EPS bearer context request message.

After receiving the activate default EPS bearer context accept message, the MME may enter a bearer context active state and stop the T3485 timer if it is running.

If the PDN connectivity request message includes a low priority indicator set as "MS is configured for NAS signaling low priority", the MME may store the NAS signaling low priority indication in the default EPS bearer context.

If the default EPS bearer context activation is part of the attach procedure, the ESM sub-layer may inform the EMM sub-layer of an ESM failure.

If the default EPS bearer context activation is not part of the attach procedure, the UE may transmit an activate default EPS bearer context reject message and enter a bearer context inactive state S11030.

The activate default EPS bearer context reject message may include an ESM cause, generally represented by one of the following cause values.

26: insufficient resources;
31: request rejected, unspecified; or
95 ? 111: protocol errors.

After receiving the activate default EPS bearer context reject message, the MME may enter a state bearer context inactive state and stop the T3485 timer if it is running.

FIG. 12 illustrates one example of a dedicated bearer deactivation procedure.

FIG. 12 illustrates a dedicated bearer activation procedure for the S5/S8 based on the GPRS tunneling protocol.

First, when dynamic PCC is disposed, PCRF transmits a PCC decision provision (QoS policy) message to a PDN GW.

Next, the PDN GW transmits, to a serving GW, a create bearer request (IMSI, PTI, EPS Bearer QoS, TFT, S5/S8 TEID, Charging Id, LBI, and Protocol Configuration Options) message for requesting creation of a bearer.

Next, the serving GW transmits, to an MME, the create bearer request (IMSI, PTI, EPS Bearer QoS, TFT, S1-TEID, PDN GW TEID (GTP-based S5/S8), LBI, and Protocol Configuration Options) message.

Next, the MME transmits, to an eNodeB, a bearer setup request (EPS Bearer Identity, EPS Bearer QoS, Session Management Request, and S1-TEID) message for requesting bearer setup.

Next, the eNodeB transmits, to the UE, an RRC connection reconfiguration (Radio Bearer QoS, Session Management Request, EPS RB Identity) message.

Next, the UE transmits an RRC connection reconfiguration complete message to the eNodeB to inform of a radio bearer activation.

Next, the eNodeB transmits a bearer setup response (EPS Bearer Identity, S1-TEID) message to the MME to inform of radio bearer activation in the UE.

Next, the UE transmits a direct transfer (Session Management Response) message to the eNodeB.

Next, the eNodeB transmits an uplink NAS transport (Session Management Response) message to the MME.

Next, the MME transmits a create bearer response (EPS Bearer Identity, S1-TEID, User Location Information (ECGI)) message to the serving GW to inform the serving GW of bearer activation.

Next, the serving GW transmits a create bearer response (EPS Bearer Identity, S5/S8-TEID, User Location Information (ECGI)) message to the PDN GW to inform the PDN GW of bearer activation.

When a dedicated bearer activation procedure is triggered from the PCRF by a PCC decision provision message, the PDN GW informs the PCRF of whether a requested PCC decision (QoS policy) has been performed.

FIG. 13 illustrates one example of a dedicated bearer deactivation procedure.

FIG. 13 is a flow diagram illustrating a dedicated bearer deactivation procedure for the S5/S8 based on the GPRS tunneling protocol.

The procedure of FIG. 13 may be used for deactivating a dedicated bearer or all of the bearers belonging to a PDN address.

When a default bearer belonging to a PDN connection is deactivated, the PDN GW deactivates all of the bearers belonging to the PDN connection. FIG. 13 should be referenced for the detailed procedure.

FIG. 14 illustrates one example of a parameter set for Quality of Service (QoS) management.

Referring to FIG. 14, a wireless communication system applies a QoS policy in unit of Service Data Flows (SDFs) comprising one or more IP flows which are user traffic classified according to services and in unit of an EPS bearer which is a logical path through which one or more SDFs are transmitted. In other words, QoS of data transmitted and received is managed by the following QoS parameters.

Resource type: indicates whether bandwidth is guaranteed.

Guaranteed bit rate (GBR): minimum guaranteed bandwidth.

Maximum bit rate (MBR): maximum allowed bandwidth.

Access Point Name-Aggregate Maximum Bit Rate (APN-AMBR): maximum bandwidth allowed per APN UE-AMBR: maximum bandwidth allowed per UE If packets are received in excess of the bandwidth specified by the QoS parameters MBR, APN-AMBR, and UE-AMBR, each of the following entities discards overflowed packets.

Rate policing for downlink data

First step: The P-GW discards packets exceeding the MBR for each received SDF.

Second step: The P-GW discards packets exceeding the MBR for one or more SDFs which have flown into each GBR EPS bearer and packets exceeding the APN-AMBR for one or more SDFs which have flown into all of non-GBR EPS bearers.

Third step: The eNB discards packets exceeding the UE-AMBR for one or more SDFs which have flown into all of non-GBR EPS bearers.

Rate policing for uplink data

First step: The UE discards packets exceeding MBR (GBR) and APN-AMBR (Non-GBR).

Second step: The eNB discards packets exceeding MBR (GBR) and UE-AMBR (Non-GBR).

Third step: The P-GW discards packets exceeding APN-AMBR for one or more SDFs which have flown into all of non-GBR EPS bearers and packets exceeding MBR for each SDF.

As described above, to transmit and receive data for providing a specific service, a dedicated bearer (for example, an EPS bearer) has to be configured separately for each service.

However, if data are transmitted or received only after a separate bearer is created for each service, a delay may be caused for data transmission of a service requiring low latency (for example, a service for informing of an urgent situation).

In other words, a problem occurs that a latency requirement of services requiring low latency may not be satisfied.

Therefore, to solve the problem above, the present invention proposes a method for transmitting and receiving data of a plurality of UEs to provide a specific service through the same session between an eNB and a network node instead of setting up a separate session for each UE.

FIG. 15 illustrates one example of a method for transmitting and receiving data of a plurality of UEs by establishing a session proposed by the present specification.

Referring to FIG. 15, when data are transmitted and received to provide a specific service requiring low latency, UEs transmit and receive data by configuring a radio bearer for providing the specific service in conjunction with an eNB; and the eNB and a gateway may transmit and receive data of a plurality of UEs through the same session by configuring a session for providing the specific service.

More specifically, in the case of providing a normal service, a UE transmits and receives data by configuring an EPS bearer in conjunction with a gateway for each service. However, when data are transmitted and received by configuring a separate bearer for each service, a latency requirement for services requiring low latency (for example, an emergency service for transmitting an urgent message) may not be satisfied.

Therefore, to satisfy the latency requirement of services requiring low latency, a plurality of data may be transmitted and received by configuring a session for transmitting and receiving data requiring the same or different Quality of Service between the eNB and the gateway.

At this time, the session configured between the eNB and the gateway may be used for transmitting uplink data transmitted from a plurality of UEs to the gateway or for transmitting downlink data transmitted to a plurality of UEs from the gateway to the eNB.

In other words, the eNB may receive uplink data for a specific service requiring low latency from a plurality of UEs and transmit the received data to the gateway through the same session.

Also, the eNB may receive downlink data for a specific service requiring low latency from the gateway and transmit the received data to a plurality of UEs through the same session.

At this time, the UE and the eNB may transmit and receive data by using a radio bearer in a connected state or transmit and receive data without establishing a radio bearer in a non-connected state.

For example, as shown in FIG. 15, when UE 1, UE 2, and UE 3 transmit and receive data for a specific service requiring low latency, UE 1 and UE 2 may transmit and receive data to and from the eNB by using a radio bearer while being connected to the eNB.

In the case of UE 3, since it is in the non-connected state with respect to the eNB, UE 3 may transmit and receive data for a specific service requiring low latency to and from the eNB while being in the non-connected state.

The eNB may transmit the data transmitted from UE 1, UE 2, and UE 3 to the gateway; or receive, from the gateway, data transmitted from UE 1, UE 2, and UE 3.

The eNB and the gateway do not configure a separate session for each UE but may transmit and receive data for the same service or data for different services through the same session.

In other words, as shown in FIG. 15, the eNB may transmit and receive data transmitted from or to be transmitted to UE 1 and UE 2 by using session 2; and transmit and receive data transmitted from or to be transmitted to UE 3 by using the session 2.

When data are transmitted and received through the same session, data may be transmitted and received though a pre-configured session without configuring a session for each UE, and thereby a delay in data transmission and reception may be reduced.

Therefore, when the method described above is used, the latency requirement of a service requiring low latency may be satisfied.

In the present invention, the gateway is a network node equipped with the U-plane function, which may be a node referred to as an S-GW/P-GW in the 3GPP 4G system or may be referred to as a different name.

FIG. 16 is a flow diagram illustrating one example of a method for transmitting and receiving data of a plurality of UEs by configuring a session proposed by the present specification.

Referring to FIG. 16, an eNB may reduce a delay in transmission and reception of data by transmitting and receiving data transmitted from a plurality of UEs in the connected or non-connected state or to be transmitted to a plurality of UEs in the connected or non-connected state through the same session.

More specifically, the eNB configures a session for transmitting and receiving data for services requiring the same or different Quality of Service in conjunction with a core network node (for example, a Mobility Management Entity (MME)) S16010.

At this time, the session created between the eNB and the gateway may be configured through an interface configuration procedure and may be used for transmitting and receiving uplink data or downlink data of a plurality of UEs for services requiring the same or different Quality of Service.

In what follows, a session used for transmitting and receiving uplink data or downlink data of a plurality of UEs for services requiring the same or different Quality of Service is referred to as an emergency session.

When the eNB attempts to transmit and receive data to and from a UE in the connected state, the eNB may create a radio bearer through the connection configuration process or the environment configuration process described above in conjunction with UE(s) S16020.

A radio bearer created between the eNB and the UE may be configured for each service and may be used for transmitting and receiving data for a specific service.

When uplink data are transmitted and received, the eNB may receive uplink data from a UE(s) by using the created radio bearer S16030.

However, when data are transmitted and received in the non-connected state between the eNB and the UE, the S16020 step is not performed, and since a radio bearer has not been created in the S16030 step, the eNB may receive uplink data from the UE in the non-connected state.

When the UE transmits uplink data to the eNB while being in the non-connected state, the uplink data may be transmitted to the eNB together with an indicator indicating that the uplink data are transmitted to the gateway by using an emergency session and data type of the uplink data.

The eNB determines a routing session for transmitting the uplink data to the gateway depending on the data type of the uplink date transmitted from the UE S16040.

In other words, the eNB determines a target service of the uplink data through the data type thereof and if multiple emergency sessions are created, selects an emergency session to which to transmit the uplink data.

The eNB transmits uplink data transmitted from the UE(s) to the gateway by using the determined routing session S16050.

When the method described above is used, a radio bearer between the UE and the eNB; and a session between the eNB and the gateway are created separately; and data of a plurality of UEs may be transmitted and received through the session between the eNB and the gateway.

Therefore, since it is not necessary to create a session separately for transmission and reception of data for each UE, the delay in data transmission and reception is reduced.

The present invention described with reference to FIG. 16 has been based on the use of uplink data; however, it should be noted that the present invention may also be applied to transmission and reception of downlink data.

However, when a plurality of UEs transmit data through the same session, the gateway is unable to know which UE has transmitted the data.

In other words, when a plurality of UEs transmit data through the same session instead of transmitting data by creating a separate session for each UE, there may be cases where the gateway is unable to know which UE has transmitted the data.

Also, in the occurrence of downlink data to be transmitted to a UE which has transmitted uplink data, the gateway is unable to recognize the UE which has transmitted the uplink data, and therefore, a problem is caused that downlink data may not be transmitted to a right UE.

To solve the problem above, a method for allocating an identifier for identifying a UE and an IP address by which to transmit and receive data is proposed for the case where data are transmitted and received through an emergency session.

A field which includes a UE identifier for identifying a UE allocated by the eNB and an eNB identifier for identifying an eNB may be composed as shown in Table 1 below.

TABLE 1

| eNB identifier | UE identifier |
| --- | --- |

In Table 1, the UE identifier may be used for identifying an UE uniquely by the eNB which has allocated the UE identifier, and the entire eNB and UE identifiers may be used for identifying a UE and an eNB uniquely within a network or across all of the networks.

To give an example in terms of the existing LTE system, Cell Radio Network Temporary Identities (C-RNTI) or temporary C-RNTI may be used as a UE identifier.

When the UE identifier is a C-RNTI or a temporary C-RNTI, the eNB allocates a temporary C-RNTI temporarily to the UE which has performed random access and when the corresponding UE enters the RRC connected state, replaces the temporary C-RNTI with the C-RNTI.

In other words, rather than allocate temporarily, the eNB allocates an identifier continuously until a connection of the corresponding UE is released or handed over.

As one example of an eNB identifier in Table 1, the following identifiers may be applied.

An IP address allocated to the eNB during a process for creating an emergency session.

A tunnel identifier when a tunneling protocol is applied between the eNB and the gateway.

An IP address allocated to the eNB for the purpose of transmitting and receiving network internal signaling.

An ID allocated to the eNB (for example, E-UTRAN Cell Global Identifier (ECGI)).

In what follows, descriptions are given under the assumption that an emergency session (session 1 and session 2) used for transmitting and receiving uplink data or downlink data of a plurality of UEs for services requiring low latency is configured as described with reference to FIG. 15.

FIG. 17 illustrates one example of a method for transmitting and receiving uplink data by configuring a session proposed by the present specification.

Referring to FIG. 17, when the UE transmits uplink data through an emergency session, the eNB allocates an identifier for identifying the UE, and the gateway identifies the UE which has transmitted the uplink data through the identifier and allocate an IP address for transmitting and receiving the data.

More specifically, ① as shown in FIG. 17(a), the eNB receives uplink data for a specific service requiring low latency from UE 1 through a radio bearer.

② The eNB selects a session to be used for transmitting received uplink data. At this time, the eNB may select a session based on at least one of the data type of the received uplink data, Quality of Service, or service type of a service to be provided through the uplink data.

③ The eNB adds, to the uplink data, at least one UE identifier field which includes a UE identifier for identifying a UE and at least one eNB identifier field which includes an eNB identifier for identifying an eNB; and transmits the field-added uplink data to the gateway by using the selected session. At this time, the eNB may determine final service recipients of the uplink data according to the type of the received uplink data.

FIG. 17(b) illustrates one example of a packet format of uplink data that an eNB transmits to a gateway. In FIG. 17(b), the Gateway IP Address field includes the address of a gateway to which the eNB transmits uplink data.

④ The gateway which has received uplink data from the eNB allocates an IP address for transmitting and receiving data to UE 1 based on the UE identifier and the eNB identifier of the uplink data. After configuring the allocated IP address as a source IP address of the uplink data, the eNB transmits the uplink data.

Table 2 below shows one example of an IP address of a UE allocated by a gateway based on the eNB identifier and the UE identifier.

TABLE 2

| Identifier | Allocated IP address |
| --- | --- |
| UE identifier of UE 1 & eNB identifier | X.X.X.X |
| ... | ... |

Afterwards, in the occurrence of data to transmit through an emergency session, the gateway may determine the eNB and the UE to which the data are supposed to be transmitted by using the allocated IP address.

When data of a plurality of UEs are transmitted by using the same session, which UE has transmitted the data may be identified by using the method descried above.

Also, by allocating an IP address to the identified UE, when data are transmitted through the emergency session in a future, a UE to which to transmit the data may be determined.

FIG. 18 illustrates another one example of a method for transmitting and receiving uplink data by configuring a session proposed by the present specification.

Referring to FIG. 18, when a UE and an eNB are not in the connected state, a temporary identifier may be allocated to identify the UE.

More specifically, © as shown in FIG. 18(a), since the eNB is not connected to UE 3, the eNB receives uplink data for a specific service requiring low latency from UE 3 through a radio bearer while being in the non-connected state.

At this time, UE 3 may transmit the uplink data to the eNB together with an indicator indicating that the uplink data are transmitted to the gateway by using an emergency session and data type of the uplink data.

② The eNB selects a session to be used for transmitting received uplink data. At this time, the eNB may select a session based on at least one of the data type of the received uplink data, Quality of Service, or service type of a service to be provided through the uplink data.

③ The eNB adds, to the uplink data, at least one UE identifier field which includes a UE identifier for identifying a UE and at least one eNB identifier field which includes an eNB identifier for identifying an eNB; and transmits the field-added uplink data to the gateway by using the selected session. At this time, since the eNB is not connected to the UE, the eNB may allocate a temporary identifier allocated temporarily to the UE (for example, a temporary C-RNTI).

Also, the eNB may determine final service recipients of the uplink data according to the type of the received uplink data.

FIG. 18(b) illustrates one example of a packet format of uplink data that an eNB transmits to a gateway. In FIG. 17(b), the Gateway IP Address field includes the address of a gateway to which the eNB transmits uplink data.

④ The gateway which has received uplink data from the eNB allocates an IP address for transmitting and receiving data to UE 1 based on the UE identifier and the eNB identifier of the uplink data. After configuring the allocated IP address as a source IP address of the uplink data, the eNB transmits the uplink data.

Table 3 below shows one example of an IP address of a UE allocated by a gateway based on the eNB identifier and the UE identifier.

TABLE 3

| Identifier | Allocated IP address |
| --- | --- |
| UE identifier of UE 1 & eNB identifier | X.X.X.X |
| UE identifier of UE 3 & eNB identifier | X.X.X.Y |
| ... | ... |

Afterwards, in the occurrence of data to transmit through an emergency session, the gateway may determine the eNB and the UE to which the data are supposed to be transmitted by using the allocated IP address.

By using the method above, when data of a UE in the non-connected state among a plurality of UEs are transmitted by using the same session, which UE has transmitted the data may be identified by allocating a temporary identifier.

Also, by allocating different IP addresses to the UEs using the same session, when data are transmitted through the emergency session in a future, a UE to which to transmit the data may be determined.

FIG. 19 illustrates one example of a method for transmitting and receiving downlink data by configuring a session proposed by the present specification.

Referring to FIG. 19, in the occurrence of downlink data to transmit through an emergency session, the gateway may identify a UE to transmit the downlink data based on a UE identifier and an eNB identifier through an allocated IP address.

More specifically, ① as shown in FIG. 19(a), a gateway receives downlink data having an IP address allocated to UE 1 as a destination address based on a UE identifier and an eNB identifier.

② The gateway may identify an eNB and a UE to which to transmit the received downlink data based on the IP address.

Also, the gateway may determine whether the received downlink data are the data transmitted through an emergency session.

For example, the gateway may select a session based on at least one of the allocated IP address, data type of downlink data, Quality of Service, or service type of a service to be provided through uplink data.

The gateway adds at least one UE identifier field including a UE identifier and at least one eNB identifier field including an eNB identifier to the downlink data and transmits the downlink data to the identified eNB so that the downlink data may be transmitted to the UE corresponding to the IP address.

For example, as shown in Table 1, if the gateway receives downlink data of which the IP address is configured as x.x.x.x, the gateway may recognize that the destination of the received downlink data is UE 1.

The gateway, which has recognized that the destination of the downlink data is UE 1, may add a UE identifier for identifying UE 1 and an eNB identifier for identifying the eNB of UE 1 to the downlink data and transmit the downlink data to the eNB by using session 2.

FIG. 19(b) illustrates one example of a packet format of downlink data.

③ The eNB, which has downlink data from the gateway through session 2, may determine a UE to which to transmit downlink data through the UE identifier field and transmit the downlink data to the determined UE.

When downlink data to be transmitted through a session which transmits and receives data of a plurality of data are generated through the method described above, the gateway may identify an eNB and a UE to which to transmit the downlink data.

FIG. 20 illustrates another one example of a method for transmitting and receiving downlink data by configuring a session proposed by the present specification.

Referring to FIG. 20, when downlink data to be transmitted to a UE in the non-connected state by using an emergency session are generated, a gateway may identify the UE to which to transmit the downlink data through an IP address allocated based on a temporary UE identifier and an eNB identifier.

More specifically, ① as shown in FIG. 20(a), the gateway receives downlink data having an IP address allocated to UE 1 as a destination address based on a UE identifier and an eNB identifier.

② The gateway may identify an eNB and a UE to which to transmit the received downlink data based on the IP address.

Also, the gateway may determine whether the received downlink data are the data transmitted through an emergency session.

For example, the gateway may select a session based on at least one of the allocated IP address, data type of downlink data, Quality of Service, or service type of a service to be provided through uplink data.

The gateway adds at least one UE identifier field including a UE identifier and at least one eNB identifier field including an eNB identifier to the downlink data and transmits the downlink data to the identified eNB so that the downlink data may be transmitted to the UE corresponding to the IP address.

At this time, since the IP address allocated to the UE has been allocated based on a temporary UE identifier, the gateway may add a temporary UE identifier field which include the temporary UE identifier to the downlink data.

For example, as shown in Table 2, if the gateway receives downlink data of which the IP address is configured as x.x.x.y, the gateway may recognize that the destination of the received downlink data is UE 3 which does not have a connection to the eNB.

The gateway, which has recognized that the destination of the downlink data is UE 3, may add a temporary UE identifier for identifying UE 3 temporarily and an eNB identifier for identifying the eNB of UE 3 to the downlink data and transmit the downlink data to the eNB by using session 2 which is an emergency session.

FIG. 20(b) illustrates one example of a packet format of downlink data.

③ The eNB which has received downlink data from the gateway through session 2 may determine a UE to which to transmit the downlink data through the temporary UE identifier field and recognize that the UE is in the non-connected state.

Afterwards, the eNB transmits the downlink data to the determined UE while being in the non-connected state.

FIG. 21 illustrates yet another one example of a method for transmitting and receiving downlink data by configuring a session proposed by the present specification.

Referring to FIG. 21, when an IP address is allocated even to a UE which has not transmitted uplink data, a gateway may transmit downlink data through an emergency session based on the allocated IP address.

More specifically, ① as shown in FIG. 21(a), the gateway receives downlink data having an IP address allocated to UE 1 as a destination address based on a UE identifier and an eNB identifier.

At this time, the UE is one which has not transmitted uplink data but to which an IP address has been allocated by the gateway.

For example, the gateway may allocate IP addresses not only to UE 1 and UE 3 which have transmitted uplink data but also to UE 5 which has not transmitted uplink data, as shown in Table 4.

TABLE 4

| Identifier | Allocated IP address |
|---|---|
| UE identifier of UE 1 & eNB identifier | X.X.X.X |
| UE identifier of UE 3 & eNB identifier | X.X.X.Y |
| ... | ... |
| UE identifier of UE 5 & eNB identifier | X.X.X.Z |

② The gateway may identify an eNB and a UE to which to transmit the received downlink data based on the IP address.

Also, the gateway may determine whether the received downlink data are the data transmitted through an emergency session.

For example, the gateway may select a session based on at least one of the allocated IP address, data type of downlink data, Quality of Service, or service type of a service to be provided through uplink data.

The gateway adds at least one UE identifier field including a UE identifier and at least one eNB identifier field including an eNB identifier to the downlink data and transmits the downlink data to the identified eNB so that the downlink data may be transmitted to the UE corresponding to the IP address.

At this time, since the IP address allocated to the UE has been allocated based on a temporary UE identifier, the gateway may add a temporary UE identifier field which includes the temporary UE identifier to the downlink data.

For example, as shown in Table 1, if the gateway receives downlink data of which the IP address is configured as x.x.x.z, the gateway may recognize that the destination of the received downlink data is UE 5.

The gateway, which has recognized that the destination of the downlink data is UE 5, may add a UE identifier for identifying UE 5 and an eNB identifier for identifying the eNB of UE 5 to the downlink data and transmit the downlink data to the eNB by using session 2.

FIG. 21(b) illustrates one example of a packet format of downlink data.

③ The eNB, which has downlink data from the gateway through session 2, may determine a UE to which to transmit downlink data through the UE identifier field and transmit the downlink data to the determined UE.

FIG. 22 is a flow diagram illustrating one example of a method for updating an identifier of a UE proposed by the present specification.

Referring to FIG. 22, when it is necessary to update a UE identifier allocated by an eNB, the serving eNB may update the UE identifier by transmitting, to the gateway, a message for updating the UE identifier.

More specifically, when the serving eNB of the UE is changed, or the state of the UE is changed, the serving eNB has to update the UE identifier allocated by the serving eNB itself.

In other words, when a specific event requiring update of the UE identifier occurs, the serving eNB has to update the UE identifier. Therefore, the serving eNB may update the UE identifier by reporting, to the eNB, that a specific event requiring update of the UE identifier has occurred.

FIG. 22(a) illustrates one example where the serving eNB reports directly to the gateway that a specific event has occurred, and FIG. 22(b) illustrates one example where the serving eNB makes indirect reporting.

Table 5 below shows one example of specific events requiring update of the UE identifier and information to be reported by the eNB.

The gateway may recognize the occurred event and changed information through the report message and updates an IP address according to the changed information.

For example, when the occurred event is handover, the gateway changes the eNB identifier from the identifier of the serving eNB to the identifier of a target eNB, and when the UE identifier is changed, the gateway changes the UE identifier from an existing UE identifier to a changed UE identifier.

Similarly, when the state of the UE is changed, or a temporary UE identifier is withdrawn, the gateway changes the eNB identifier from the identifier of the serving eNB to the identifier of a network node which performs the function of controlling mobility of UEs and updates the UE identifier from an existing UE identifier to the identifier of a UE in the network node.

In other words, when the state of the UE changes from the connected to the idle state, or a temporary UE identifier is withdrawn, the serving eNB no longer manages the UEs, but the network node, which performs the function of controlling mobility of UEs, manages the UEs, the eNB identifier is updated to the identifier of the network node.

Through the operations above, even if the eNB identifier and/or UE identifier is changed, the gateway may identify a

TABLE 5

| Event | Reported information |
|---|---|
| Movement of a UE in the connected state (for example, handover) | Current UE identifier (serving eNB identifier and UE identifier allocated by a serving eNB) Target eNB identifier UE identifier allocated by target eNB (when the UE identifier allocated by the target eNB is different from the UE identifier allocated by the serving eNB) |
| State transition of a UE (from the connected to the idle state) Withdrawal of a temporary UE identifier allocated to a UE in the idle state for transmitting and receiving data (for example, withdrawal of temporary C-RNTI) | Current UE identifier Identifier of a network node which performs the function of controlling mobility of UEs (for example, MME) Identifier of a UE in the network node (for example, GUTI in the LTE system) |

When a specific event as shown in Table 5 occurs, the eNB identifier and/or UE identifier may be changed, and therefore, the IP address allocated by the gateway based on the eNB identifier and the UE identifier has to be updated according to the changed information.

Therefore, the serving eNB transmits changed information to the gateway, and the gateway updates the allocated IP address according to the changed information.

As shown in FIG. 22(a), when the serving eNB itself transmits changed information to the gateway, the serving eNB transmits a report message including reported information of Table 5 to the gateway according to the event information representing an event occurred and the corresponding event S22010.

As shown in FIG. 22(b), when the serving eNB indirectly transmits changed information to the gateway, the serving eNB transmits a report message including reported information of Table 5 to a core network node (e.g., MME, etc.) that performs a network control function, according to the event information representing an event occurred and the corresponding event S22110.

The core network node that received the report message from the serving eNB transmits the report message to the gateway S22120.

UE to or from which to transmit and receive data through update of an allocated IP address by using an emergency session.

FIG. 23 is a flow diagram illustrating one example of a method for releasing an IP address of a UE proposed by the present specification.

Referring to FIG. 23, the IP address allocated by the gateway may be released through a release procedure triggered by the serving eNB or the gateway.

FIG. 23(a) illustrates one example of a procedure for releasing an IP address triggered by the eNB, and FIG. 23(b) illustrates one example of a procedure for releasing an IP address triggered by the gateway.

The IP address allocated or updated by the gateway, as described with reference to FIGS. 17 to 22, is valid until a separate control message for release of the IP address is properly transmitted and received. Therefore, the eNB or the gateway has to perform a release procedure to release the allocated IP address.

As shown in FIG. 23(a), when the release procedure is triggered by the eNB, the serving eNB transmits, to an MME, a release request message for requesting release of the IP address allocated by the gateway.

At this time, the MME indicates a network node which performs a control function and may be referred to as a different name.

The MME, which has received a release request message from the serving eNB, transmits the received message to the gateway S23010.

The gateway, which has received a release request message from the MME, releases the allocated IP address based on the UE identifier of the corresponding UE and the eNB identifier of the serving eNB; and transmits a release response message to the MME.

The MME which has received the corresponding response message transmits the received message to the serving eNB S23020.

The serving eNB which has received a release response message may recognize that the allocated IP address has been successfully released.

As shown in FIG. 23(b), when the release procedure is triggered by the gateway, the gateway releases the allocated IP address based on the UE identifier of the corresponding UE of the serving eNB and the eNB identifier of the serving eNB; and transmits, to the MME, a release indication message for indicating release of the IP address.

The MME, which has received a release indication message from the serving eNB, transmits the received message to the serving eNB S23110.

The eNB, which has received a release indication message from the MME, may recognize that the allocated IP address has been released based on the eNB identifier of the corresponding UE and the serving eNB.

The serving eNB transmits a release response message to the gateway in response to the release indication message through the MME, and thereby the release procedure for releasing an IP address is terminated S23120.

As another embodiment of the present invention, an allocated IP address may be released based on a timer.

More specifically, the allocated IP address may remain valid until a specific timer is terminated without a release procedure due to transmission and reception of a separate control message as described with reference to FIG. 23.

In other words, if a specific timer is terminated, the allocated IP address may be released.

The IP address may be released according to a condition for starting and resetting a timer for a valid duration with respect to each UE identifier between the eNB and the gateway.

More specifically, a timer for a valid duration is (re)started/reset whenever uplink data and/or downlink data are transmitted or received through an emergency session, and when there is no transmission or reception of uplink data and/or downlink data through the emergency session until the timer is terminated, the IP address allocated to the corresponding UE is released.

At this time, the timer for a valid duration may be configured with a flexible value (for example, a value configured depending on the type of data) transmitted together with data or configured with a predefined fixed value.

Also, when a procedure for updating a UE identifier descried with reference to FIG. 22 is performed, the timer for a valid duration may operate as follows.

When a UE identifier is updated due to handover, the timer for a valid duration is not reset but continuously operates at a target eNB. Therefore, in the occurrence of handover, the serving eNB transmits the value of the timer for a valid duration to the target eNB, and the target eNB continues to advance the timer value.

When the state of the UE transitions from the connected state to the idle state, or the UE identifier is updated due to withdrawal of a temporary UE identifier of the UE, the eNB stops the timer for a valid duration of the corresponding UE, and only the timer for a valid duration of the gateway continues to operate.

In other words, when the state of the UE transitions from the connected state to the idle state, or the UE identifier is updated due to withdrawal of a temporary UE identifier of the UE, the serving eNB no longer manages the UE.

Therefore, the eNB stops the timer for a valid duration for data transmission and reception of the UE through an emergency session, and only the gateway continues to operate the timer of a valid duration.

Through the method described above, the gateway may release the allocated IP address.

FIG. 24 is a flow diagram illustrating one example of a method for an eNB to transmit and receive data of a UE by configuring a session proposed by the present specification.

Referring to FIG. 24, an eNB may transmit and receive data through a session for transmitting and receiving data of a plurality of UEs by allocating a UE identifier for identifying a UE.

More specifically, the eNB establishes a first session for transmitting and receiving data to and from a first network node (for example, MME) which performs a control function S24010.

The first session is the same session as the emergency session described with reference to FIGS. 15 to 21 and is used for transmitting, to the gateway, uplink data having the same or different Quality of Service transmitted from a plurality of UEs or used for transmitting, form the gateway to the eNB, downlink data having the same or different Quality of Service transmitted to a plurality of UEs.

Afterwards, the eNB receives uplink data for providing a specific service from a UE in the non-connected state S24020. If the uplink data are transmitted in the non-connected state, the uplink data may be transmitted to the eNB together with an indicator indicating that the uplink data are transmitted to the gateway by using the first session and the datatype of the uplink data.

Afterwards, the eNB allocates a first UE identifier for a second network node (gateway) to identify a UE which transmits the uplink data S24030. In other words, since uplink data transmitted from a plurality of UEs are transmitted to the gateway through the same session without configuring a session between the eNB and the second network node according to a service for each UE, the eNB allocates UE identifiers so that the gateway may identify the UEs which have transmitted the uplink data.

Afterwards, the eNB transmits the uplink data to the second network node together with the first UE identifier and an eNB identifier for identifying the eNB. The second network node allocates an IP address based on the transmitted first UE identifier and the eNB identifier, and afterwards, when downlink data to be transmitted through the first session is generated, the eNB may transmit the generated downlink data to the UE through the allocated IP address.

FIG. 25 illustrates one example of an internal block diagram of a wireless apparatus to which the present invention may be applied.

Here, the wireless apparatus may be an eNB or a UE, and the eNB includes both of the macro and small eNBs.

As shown in FIG. 25, the eNB 2510 and the UE 2520 include a communication unit (transmitting and receiving unit, RF unit) 2513, 2523, processor 2511, 2521, and memory 2512, 2522.

In addition to the components, the eNB and the UE may further include an input unit and an output unit.

The communication unit 2513, 2523, processor 2511, 2521, input unit, output unit, and memory 2512, 2522 are functionally connected to perform the method proposed by the present specification.

Receiving information generated from the Physical Layer (PHY) protocol, the communication unit (transmitting and receiving unit or RF unit, 2513, 2523) moves the received information to the radio-frequency spectrum and performs filtering, amplification, and so on to transmit the received information through an antenna. Also, the communication unit moves a Radio Frequency (RF) signal received from the antenna from the PHY protocol to a frequency band in which the received RF signal may be processed and performs filtering.

And the communication unit may also include a switch function for switching the transmission and reception functions.

The processor 2511, 2521 implements functions, processes and/or methods proposed by the present specification. Layers of a radio interface protocol may be implemented by the processor.

The processor may also be referred to as a controller, control unit, or computer.

The memory 2512, 2522, being connected to the processor, stores protocols or parameters required for performing an uplink resource allocation method.

The processor 2511, 2521 may include Application-Specific Integrated Circuit (ASIC), other chipset, logical circuit and/or data processing device. The memory may include Read-Only Memory (ROM), Random Access Memory (RAM), flash memory, memory card, storage medium and/or other storage device. The communication unit may include a baseband circuit for processing a radio signal. When an embodiment is implemented by software, the aforementioned method may be implemented by a module (process or function) which performs the aforementioned function.

A module is stored in the memory and may be executed by the processor. The memory may be installed inside or outside the processor and may be connected to the processor via various well-known means.

The output unit (display unit) is controlled by the processor and outputs information output from the processor together with a key input signal generated by the key input unit and various types of information signals from the processor.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

This document discloses an RRC connection method in a wireless communication system with examples based on the 3GPP LTE/LTE-A system; however, the present invention may be applied to various other types of wireless communication systems in addition to the 3GPP LTE/LTE-A system.

The invention claimed is:

1. A method for transmitting and receiving data by a base station in a wireless communication system, the method comprising:
   establishing a first session for transmitting and receiving data to and from a first network node;
   receiving, based on the establishing, uplink data for providing a specific service from a user equipment (UE) in a connected or unconnected state;
   allocating a first UE identifier to identify the UE by a second network node; and
   transmitting the uplink data to the second network node together with the first UE identifier and a base station identifier for identifying the base station,
   wherein the first session is a wireless path for transmitting and receiving data with same service quality to and from a plurality of UEs.

2. The method of claim 1, wherein, when the uplink data are transmitted through the first session, the first UE identifier is an identifier for the second network node to identify the UE that transmitted the uplink data.

3. The method of claim 1, further comprising establishing a second session for transmitting and receiving data of the specific service to and from the UE, wherein the uplink data are transmitted to the base station through the second session.

4. The method of claim 3, wherein the establishing the second session comprises: receiving a connection request message for establishing the second session from the UE; and transmitting a connection response message in response to the connection request message.

5. The method of claim 1, wherein, when the UE transmits the uplink data in an unconnected state, the uplink data are transmitted together with a first indicator, which indicates that the uplink data use the first session, and data type information of the uplink data.

6. The method of claim 1, further comprising, when a specific event occurs, transmitting a report message for reporting update of the first UE identifier due to the specific event to a third network node which performs a function of controlling the second network node or a network node, and wherein the specific event is one of handover of the UE, connected state transition of the UE, or release of a temporary UE identifier allocated to the UE, and the report message includes the first UE identifier.

7. The method of claim 6, wherein, when the specific event is the handover, the report message further includes a target base station identifier for identifying a target base station and a second UE identifier allocated by the target base station.

8. The method of claim 1, further comprising receiving downlink data from the second network node, wherein the downlink data are transmitted together with the first UE identifier and an IP address representing a destination of the downlink data.

9. The method of claim 8, wherein the IP address is allocated by the second network node based on the first UE identifier and the base station identifier.

10. The method of claim 9, wherein the IP address is released by an IP address release procedure in conjunction with the second network or when data of the UE are not transmitted or received through the first session for a specific time period.

11. An apparatus for transmitting and receiving data in a wireless communication system, the apparatus comprising:
a transceiver configured to transmit and receive radio signals; and
a processor functionally linked to the transceiver, wherein the processor is configured to:
establish a first session for transmitting and receiving data to and from a first network node;
receive, based on the establishing, uplink data for providing a specific service from a user equipment (UE) in a connected or unconnected state;
allocate a first UE identifier for a second network node to identify the UE by a second network node; and
transmit the uplink data to the second network node together with the first UE identifier and a base station identifier for identifying a base station or the apparatus,
wherein the first session is a wireless path for transmitting and receiving data with same service quality to and from a plurality of UEs.

12. The apparatus of claim 11, wherein, when the uplink data are transmitted through the first session, the first UE identifier is an identifier for the second network node to identify the UE that transmitted the uplink data.

13. The apparatus of claim 11, wherein the processor is configured to establish a second session for transmitting and receiving data of the specific service to and from the UE, and wherein the uplink data are transmitted to the base station or the apparatus through the second session.

14. The apparatus of claim 13, wherein the processor is configured to receive a connection request message for establishing the second session from the UE; and transmit a connection response message in response to the connection request message.

15. The apparatus of claim 11, wherein, when the UE transmits the uplink data in an unconnected state, the uplink data are transmitted together with a first indicator, which indicates that the uplink data use the first session, and data type information of the uplink data.

16. The apparatus of claim 11, wherein, when a specific event occurs, the processor is configured to transmit a report message for reporting update of the first UE identifier due to the specific event to a third network node which performs a function of controlling the second network node or a network node, and wherein the specific event is one of handover of the UE, connected state transition of the UE, or release of a temporary UE identifier allocated to the UE, and the report message includes the first UE identifier.

17. The apparatus of claim 16, wherein, when the specific event is the handover, the report message further includes a target base station identifier for identifying a target base station and a second UE identifier allocated by the target base station.

18. The apparatus of claim 11, wherein the processor is configured to receive downlink data from the second network node, and wherein the downlink data are transmitted together with the first UE identifier and an IP address representing a destination of the downlink data.

19. The apparatus of claim 18, wherein the IP address is allocated by the second network node based on the first UE identifier and the base station identifier.

20. The apparatus of claim 19, wherein the IP address is released by an IP address release procedure in conjunction with the second network or when data of the UE are not transmitted or received through the first session for a specific time period.

* * * * *